(12) United States Patent
Chakrapani et al.

(10) Patent No.: US 11,468,228 B2
(45) Date of Patent: Oct. 11, 2022

(54) CONTENT FRAMES FOR PRODUCTIVITY APPLICATIONS

(71) Applicant: Microsoft Technology Licensing, LLC, Redmond, WA (US)

(72) Inventors: Niyathi Nidhi Chakrapani, Seattle, WA (US); Mark James Encarnacion, Bellevue, WA (US); Silviu-Petru Cucerzan, Redmond, WA (US); James Stephen Woffinden-Luey, Carnation, WA (US); Ryen William White, Woodinville, WA (US); Bernhard S. J. Kohlmeier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/161,135

(22) Filed: Jan. 28, 2021

(65) Prior Publication Data

US 2022/0237372 A1 Jul. 28, 2022

(51) Int. Cl.
*G06F 40/18* (2020.01)
*G06F 40/186* (2020.01)
*G06F 16/245* (2019.01)
*G06F 40/169* (2020.01)

(52) U.S. Cl.
CPC .......... *G06F 40/186* (2020.01); *G06F 16/245* (2019.01); *G06F 40/169* (2020.01)

(58) Field of Classification Search
None
See application file for complete search history.

(56) References Cited

U.S. PATENT DOCUMENTS

| 6,239,802 B1* | 5/2001 | Lahey ............... G06F 9/451 715/810 |
| 7,287,219 B1* | 10/2007 | Young ............... G06F 40/143 715/234 |
| 10,339,183 B2* | 7/2019 | Kohlmeier ......... G06F 16/9024 |
| 10,534,847 B2* | 1/2020 | Krishna ............. G06F 40/186 |
| 2005/0071755 A1* | 3/2005 | Harrington ......... G06F 40/143 715/229 |

(Continued)

OTHER PUBLICATIONS

"International Search Report and Written Opinion Issued in PCT Application No. PCT/US21/064765", dated Apr. 8, 2022, 10 Pages.

*Primary Examiner* — Howard Cortes
(74) *Attorney, Agent, or Firm* — Talem IP Law, LLP

(57) ABSTRACT

Content frames can be provided for productivity applications through a content frame platform. The platform can detect a sequence of similar documents ("a document run") and provide functionality to easily create the next document in the sequence through a content frame. The platform can receive a trigger for a content frame for a new document; and, in response, determine whether the new document belongs to a document run. In response to determining the new document belongs to a document run, the platform can determine at least two documents in the document run to be used to create the content frame and identify common content between the at least two documents in the document run. The content frame, which can include at least an outline for the new document and sections of updatable content for the new document, can be generated using the common content and provided for display and/or editing.

20 Claims, 18 Drawing Sheets

(56) References Cited

U.S. PATENT DOCUMENTS

| | | | |
|---|---|---|---|
| 2006/0080329 A1* | 4/2006 | Skibo | G06F 40/186 |
| 2007/0239802 A1* | 10/2007 | Razdow | G06F 16/93 |
| 2009/0043824 A1* | 2/2009 | Claghorn | G06F 16/93 |
| 2009/0249180 A1* | 10/2009 | Cheng | G06F 40/103 |
| | | | 715/206 |
| 2011/0161168 A1* | 6/2011 | Dubnicki | G06Q 30/0276 |
| | | | 705/14.49 |
| 2012/0110439 A1* | 5/2012 | Rosner | G06F 40/186 |
| | | | 715/246 |
| 2013/0262420 A1* | 10/2013 | Edelstein | G06F 40/197 |
| | | | 707/695 |
| 2014/0229441 A1* | 8/2014 | McLennan | G06F 40/194 |
| | | | 707/638 |
| 2015/0199345 A1* | 7/2015 | Joshi | G06F 3/0482 |
| | | | 707/723 |
| 2017/0220544 A1* | 8/2017 | Masson | G06F 3/04842 |
| 2017/0220545 A1* | 8/2017 | Gururajan | G06F 40/106 |
| 2017/0364701 A1* | 12/2017 | Struttmann | G06F 16/2282 |
| 2018/0196802 A1* | 7/2018 | Abou Mahmoud | G06F 40/194 |
| 2019/0303429 A1* | 10/2019 | Tomita | G06F 40/169 |
| 2020/0104353 A1 | 4/2020 | Chua et al. | |
| 2020/0159819 A1* | 5/2020 | Carteri | G06F 40/169 |

\* cited by examiner

Weekly Meeting Notes_11-11-2020    Application    — □ ×
≡ Home Insert Draw View Tools    Q Q Share

205

Meeting Date: 11/11/2020
Last Meeting Date: 11/04/2020

Attendees: John, Colin, Aubrey, Liam, Laura, Amy, Seth, Ryan, Andrea

Action Items Update:
1. Aubrey will be out of the office from 11/23/2020-12/1/2020
2. Colin, Laura, Ryan, and Andrea - must obtain recertification by 12/1/2020
3. Liam will be presenting at the 2020 Annual Meeting on 11/20/2020
4. Amy – updating the systems over the weekend (11/14/2020-11/15/2020)

Topics:
1. Updates on new building construction
2. Communication guidelines discussion
3. Review of Bylaws Update
4. Latest regarding Initiative A

Committees:
1. Programming Committee
   a. 2020 Annual Meeting currently taking place through 11/20/2020
      i. 8,291 attendees registered
      ii. 25 speakers
2. Membership Committee
   a. Renewal period is open through end of year
      i. 15,000 members renewed as of 11/11/2020

FIG. 2A

Weekly Meeting Notes_11-18-2020    Application

Home  Insert  Draw  View  Tools

210

Meeting Date: 11/11/2020
Last Meeting Date: 11/04/2020

Attendees: John, Colin, Aubrey, Liam, Laura, Amy, Seth, Ryan, Andrea

Action Items Update:
1. Aubrey will be out of the office from 11/23/2020-12/1/2020
2. Colin, Laura, Ryan, and Andrea - must obtain recertification by 12/1/2020
3. Liam will be presenting at the 2020 Annual Meeting on 11/20/2020
4. Amy – updating the systems over the weekend (11/14/2020-11/15/2020)

Topics:
1. Updates on new building construction
2. Communication guidelines discussion
3. Review of Bylaws Update
4. Latest regarding Initiative A

Committees:
1. Programming Committee
   a. 2020 Annual Meeting currently taking place through 11/20/2020
      i. 8,291 attendees registered
      ii. 25 speakers
2. Membership Committee
   a. Renewal period is open through end of year
      i. 15,000 members renewed as of 11/11/2020

FIG. 2B

```
Weekly Meeting Notes_11-04-2020     Application                 | — ☐ ×
≡ Home Insert Draw View Tools                                   ዳ ዳShare
```

Meeting Date: 11/04/2020
Last Meeting Date: 10/29/2020                                   <u>215</u>

Attendees: John, Colin, Aubrey, Liam, Laura, Amy, Seth, Ryan, Andrea

Action Items Update:
   1. Seth will be out of the office from 11/04/2020-11/06/2020
   2. Colin, Laura, Ryan, and Andrea - must obtain recertification by 12/1/2020
   3. Liam will be presenting at the 2020 Annual Meeting on 11/20/2020
   4. Bylaws Update will be released on 11/09/2020

Topics:
   1. Updates on new building construction
   2. Leadership skills discussion
   3. Discussion on Initiative A

Committees:
   1. Programming Committee
      a. 2020 Annual Meeting starting 11/11/2020
         i. 6,003 attendees registered as of
         ii. 20 speakers confirmed – 5 left
   2. Membership Committee
      a. Renewal period is open through end of year
         i. 13,537 members renewed as of 11/04/2020

```
Weekly Meeting Notes_11-11-2020     Application                 | — ☐ ×
≡ Home Insert Draw View Tools                                   ዳ ዳShare
```

Meeting Date: 11/11/2020
Last Meeting Date: 11/04/2020                                   <u>205</u>

Attendees: John, Colin, Aubrey, Liam, Laura, Amy, Seth, Ryan, Andrea

Action Items Update:
   1. Aubrey will be out of the office from 11/23/2020-12/1/2020
   2. Colin, Laura, Ryan, and Andrea - must obtain recertification by 12/1/2020
   3. Liam will be presenting at the 2020 Annual Meeting on 11/20/2020
   4. Amy – updating the systems over the weekend (11/14/2020-11/15/2020)

Topics:
   1. Updates on new building construction
   2. Communication guidelines discussion
   3. Review of Bylaws Update
   4. Latest regarding Initiative A

Committees:
   1. Programming Committee
      a. 2020 Annual Meeting currently taking place through 11/20/2020
         i. 8,291 attendees registered
         ii. 25 speakers
   2. Membership Committee
      a. Renewal period is open through end of year
         i. 15,000 members renewed as of 11/11/2020

CONTENT FRAMES FOR PRODUCTIVITY APPLICATIONS

BACKGROUND

Productivity applications include reading and authoring tools for creating, editing, and consuming (e.g., by viewing or listening to) documents, presentations, spreadsheets, databases, charts and graphs, images, video, audio, and the like. These applications can be in the form of a word processing software, spreadsheet software, personal information management (PIM) and email communication software, presentation programs, note taking/storytelling software, diagram and flowcharting software, document viewing software, web browser software, and the like. Examples of productivity applications include the MICROSOFT OFFICE suite of applications from Microsoft Corp., such as MICROSOFT WORD, MICROSOFT EXCEL, MICROSOFT ONENOTE, all registered trademarks of Microsoft Corp.

Reusing content from previous files is a critical scenario for many productivity application users. Conventionally, users reuse content by opening an existing document, saving it under a different name, and then clearing out and overwriting the content that is no longer needed. For some document types, such as sales proposals or monthly reports, it is often a collaborative effort. Typically, the document owner assigns sections for others to complete.

BRIEF SUMMARY

Systems and methods for providing content frames for productivity applications are described. The described content frames can be provided through a content frame platform. The content frame platform can detect a potential sequence of similar documents, referred to as a document run, and provide functionality for the user to easily create the next document in the sequence through the use of a content frame, thus expediting the authoring process. Indeed, the content frame platform provides a way for users to interact with and assemble content for a new document from existing documents.

The content frame platform can receive a trigger for a content frame for a new document; and in response to receiving the trigger, determine whether the new document belongs to a document run. In response to determining the new document belongs to a document run, the content frame platform can determine at least two documents in the document run to be used to create the content frame and identify common content between those at least two documents in the document run. The content frame, which can include at least an outline for the new document and sections of updatable content for the new document, can be generated using the common content and provided for display. In some cases, the content that differs can also be provided for display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2A-2F illustrate example scenarios for providing content frames for productivity applications according to an embodiment of the invention.

FIGS. 5A-5D illustrate example scenarios for providing content frames for productivity applications according to certain embodiments of the invention.

FIG. 6 illustrates an example content frame according to an embodiment of the invention.

DETAILED DESCRIPTION

Figure 1:
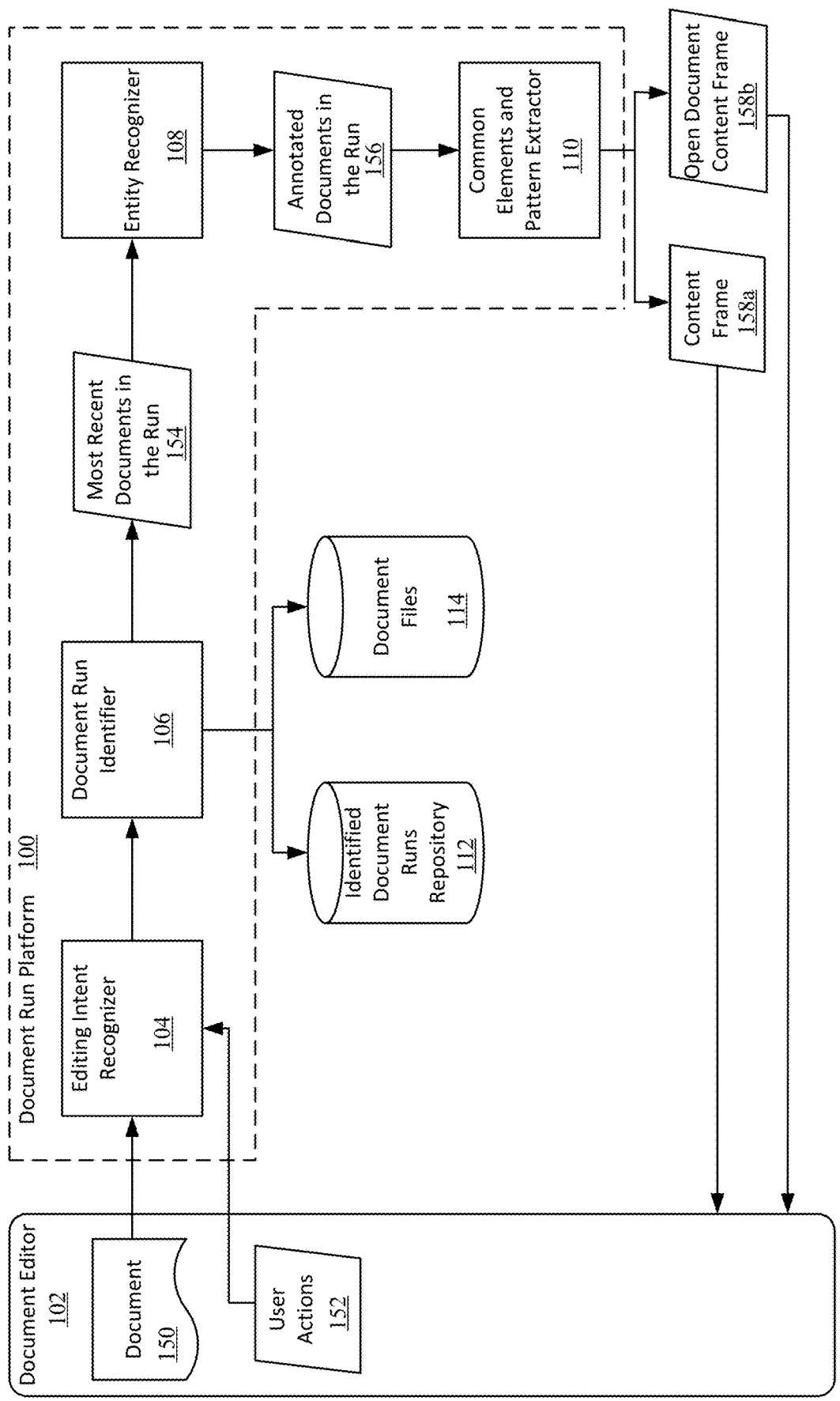
FIG. 1 illustrates an example implementation of providing content frames for productivity applications according to an embodiment of the invention.

Systems and methods for providing content frames for productivity applications are described. The described content frames can be provided through a content frame platform.

The content frame platform can detect the sequence of similar documents, referred to as a document run, and provide functionality for the user to easily create the next document in the sequence through the use of a content frame, thus expediting the authoring process. Indeed, the content frame platform provides a way for users to interact with and assemble content for a new document from existing documents. Through the described content frame platform, document owners can simply start a new version of a document: no more save as, rename, delete content, assign to owners, send email, etc.

A content frame includes at least an outline for the new document and portions of updatable content for the new document. The content frame platform helps users that created the existing documents in a document run to be able to continue to write another document similar to those existing documents. This may be conceptually thought of as reducing a document to a skeleton and then refilling that document.

Content frames can be provided for a variety of productivity applications. Productivity applications provide tools and platforms to author and consume content in electronic form, including documents such as, but not limited to, word processing documents, notebook documents, presentation documents, spreadsheet documents, and webpage documents. As will be discussed, multiple entry points into the described content frame platform exist for a user to create and assemble content for a new document in a document run.

In one scenario, a user can save an existing document in a document run as a new document with a similar name. Once the user starts editing the new document, the user can be offered an entry point to the content frame platform, which helps the user update the new document.

In another scenario, a user can save an existing document in a document run as a new document with a similar name. The user can open a search pane within the productivity application and be offered an entry point to the content frame platform.

In another scenario, a user can open a blank new file, or an existing file, and be presented with a command for a content frame. Here, the user explicitly requests an entry point to the content frame platform. The user can select the command for a content frame, begin to assemble content from a recent file in a document run.

In yet another scenario, prior to opening a blank new file, when a user begins to create a new file, the user can be presented with a command for a content frame. Once the user selects the command for the content frame, the user can begin to assemble content from a recent file in a document run.

A "document run" refers to a sequence of two or more similar existing documents. Advantageously, the content frame platform can help the user with the process of creating a new document in the document run by proactively detecting the document run or a new document in the document run and offering the user an experience that simplifies the process and helps them assemble their document.

To be considered "similar" the two or more similar documents may be lexically similar and/or semantically similar. For example, each of the two or more similar documents in the document run may be previous versions of a same document. In some cases, the degree of similarity between two texts are determined. For example, similarity between two documents can be determined using any suitable algorithm for estimating the degree of similarity between two texts, including, but not limited to, one or more of, embeddings, cosine similarity, smooth inverse frequency, K-means, Word2Vec, Jensen-Shannon distance, Word Mover Distance, Variational Auto Encoder, Universal sentence encoder, Siamese Manhattan long short-term memory (LSTM), and knowledge-based measures.

Documents that are highly structured can often be part of a document run. In some cases, document runs include periodic documents. Periodic documents can be a series of documents that are fairly similar to one another and are reoccurring. A user creates periodic documents regularly. Examples of documents in this type of document run can include, but is not limited to, newsletters, quarterly financial reports or weekly status reports.

In some cases, document runs include a series of documents that are not necessarily about the same subject; but they have a very similar format. The series of documents may have some similar entities and some different entities; or there may be different dates or different figures. Here, while the series of documents may not necessarily be about the same subject, the user would like to reuse the content that they have already created.

One example of this type of document run includes contracts between different companies. There can be a significant portion of the content that stays the same in a contract, but some content needs to be updated. For example, the user may change a preamble, a company name, or an address.

In some cases, a content frame can be generated for a collaboration platform, such as SharePoint, or social network, such as Yammer, post or update. In some cases, a content frame can be generated for an email. In an example where a user creates a daily email, the content frame platform can identify and reuse the common content from the previous daily emails to help the user draft the next daily email.

In some cases, a content frame can be generated for a spreadsheet. In an example where a user creates a monthly inventory spreadsheet, the content frame platform can identify and reuse the common content, such as headers, from the previous monthly inventory spreadsheets to help the user create the next monthly inventory spreadsheet. In some cases, the content frame platform can link one or more of the values in the monthly inventory spreadsheet to the source of that value. In these cases, values can be prefilled within the monthly inventory spreadsheet and the user can validate those values.

Common content from the existing documents in the document run can be employed to form the basis of a content frame for the new document. At least a portion of the common content is reused within the content frame to create the starting point for the next document in the document run. Content that is obsolete and needs to be redone (e.g., content from the existing documents in the document run that is not common) can be deleted.

Any portions of content that are subject to updates can either be deleted completely or replaced with, for example, a placeholder or inline note. The placeholder or inline note can help the user understand the portions of content that needs to be input or updated.

The content frame platform can identify a specific value that changes in each of the existing documents in the document run and can replace that value in the content frame with a placeholder. In some cases, the placeholder for that specific value can be linked to the source of that value and the content frame platform can automatically pre-fill the value. Thus, instead of having the user input the specific value, the user can simply validate that the pre-filled value is correct.

The content frame may be a cached content frame or an open document content frame. A cached content frame is a content frame that has been generated using a previously identified document run. For example, when the content frame platform identifies a document run and generates a corresponding content frame, the document run and corresponding content frame can be stored in an identified document run repository. Then, when a content frame is requested for that document run, the content frame platform can obtain the corresponding cached content frame. The cached content frame can be updated, if necessary.

An open document content frame is a content frame that is generated and displayed through an open document the user is interacting with. For example, a user can open the last document created in a document run and save it with a new name. Then, the content frame platform can identify that the user intends to reuse content from that existing document in a new document and in a similar manner as that existing document. The content frame platform can modify the open document that the user is interacting with to generate the content frame. Indeed, the content frame platform can apply common content to the current document that the user has open and is modifying. For example, the content frame platform can apply several different shades of highlighting to the content in the open document. One shade of highlighting can identify portions of content that should be maintained, while another shade of highlighting can identify portions of content that should be updated. In some cases, another shade of highlighting can identify portions of content that should be deleted with one click. In some cases, the portions of content that should be deleted can be automatically deleted by the content frame platform.

FIG. 1 illustrates an example process for providing content frames for productivity applications according to an embodiment of the invention; and FIGS. 2A-2F illustrate example scenarios for providing content frames for productivity applications according to an embodiment of the invention.

Referring to FIG. 1, in the example process for providing content frames for productivity applications there can be communication between a content frame platform 100 and a document editor 102 of a productivity application (not shown). The content frame platform 100 can include or communicate with an editing intent recognizer 104, a document run identifier 106, an entity recognizer 108, a common elements and patterns extractor 110, and one or more storage resources (e.g., an identified document runs repository 112 and a document file storage resource 114).

The identified document runs repository 112 may include a local identified-document-runs repository and/or a remote identified-document-runs repository. The identified document runs repository 112 stores information of previously identified document runs. The previously identified document runs may be identified for a user and/or a user group. The document file storage resource 114 may include cloud storage resource(s) and/or enterprise resource(s).

Referring to FIG. 1 and FIGS. 2A-2F, the example process for providing content frames for productivity applications begins with a user interacting with a document (e.g., document 150) in the document editor 102 to create and assemble content for a new document. With user permission, user action data (e.g., user actions 152) are collected while the user is interacting with the document within the document editor 102.

The document and the user action data can be communicated to the editing intent recognizer 104. The editing intent recognizer 104 can analyze the document and the user action data to determine if the user intends to reuse content from an existing document in a document run. If the editing intent recognizer 104 determines that the user does intend to reuse content from an existing document, then a trigger for a content frame for the document may be communicated from the editing intent recognizer 104 to the document run identifier 106. The trigger informs the content frame platform 100 that the user would like to reuse content in a manner that the user has done before, and a content frame should be provided if the document belongs to a document run. The trigger informs the document run identifier 106 to make a determination as to whether the document belongs to a document run.

There are many behavioral, content, and context signals that can indicate that a user intends to reuse content from an existing document in a document run. For example, there are a variety of different scenarios where the user action data can indicate that a user intends to reuse content from an existing document in a document run. In one scenario, a user saves a copy of a just-opened document in a productivity application under a new document name. In another scenario, a user opens an existing document and deletes the main content but retains the headers. In another scenario, a user copies content of an existing file to a file with a new name and opens for editing that file having the new name.

In some cases, the trigger is time based. For example, if the user creates a new document each Monday, then when the next Monday rolls around, a content frame for a new document can be automatically offered to the user, without requiring action on the part of the user.

In yet another scenario, a user opens a document that has a recent modification time and is identical to another document in the same location, with an older modification time, that is part of an identified document run. In yet another scenario, a user explicitly requests a content frame (e.g., by clicking a button on the ribbon). In yet another scenario, the user regularly copies and pastes between documents.

As an illustrative example, a user is in charge of taking notes during each weekly meeting. Each week, the user creates a new weekly meeting notes document that is similar to the meeting notes the user previously created in the weeks prior. In the illustrative example, the next weekly meeting takes place on Nov. 18, 2020. To create the next document in the sequence of next weekly meeting documents, the user typically opens an existing document, saves it under a different name, and then clears out or overwrites the content that is no longer needed. As can be seen in FIG. 2A and FIG. 2B, the user opened "Weekly Meeting Notes_11-11-2020" document 205 and saved the document 205 under a different name to create "Weekly Meeting Notes_11-18-2020" document 210. Here, the user wants to reuse content from an existing document (e.g., document 205) in a new document (e.g., document 210) in a document run.

The content frame platform 100 can detect the sequence of existing weekly meeting notes documents (document run) and provide the functionality for the user to easily create the next document in the sequence through the use of a content frame, thus expediting the authoring process. In this illustrative example, document 210 along with user action data including that the user saved a copy of a just-opened document (e.g., document 205) under a new document name is communicated to the editing intent recognizer 104. The editing intent recognizer 104 can determine that the user intends to reuse content from an existing document in a document run based on the document 210 along with user action data. The editing intent recognizer 104 can communicate a trigger to the document run identifier 106. The trigger indicating that the user would like to reuse content in a manner that the user has done before. In some cases, the document 210 is communicated with the trigger to the document run identifier 106.

Returning to FIG. 1, in response to receiving the trigger, the document run identifier 106 can determine whether the document belongs to a document run. Here, the document run identifier 106 can attempt to identify a document run in which the document belongs.

The document run identifier 106 can determine whether the document belongs to a document run by querying one or more data resources for existing documents similar to the document. The one or more data resources that are queried can include the identified document runs repository 112 and the document file storage resource 114.

The identified document runs repository 112 can be queried to determine if the document is part of a previously identified document run. The determination may be based on a measure of similarity. The measure of similarity between two documents can be determined using any suitable algorithm for estimating the degree of similarity between two texts, including, but not limited to, one or more of, embeddings, cosine similarity, smooth inverse frequency, K-means, Word2Vec, Jensen-Shannon distance, Word Mover Distance, Variational Auto Encoder, Universal sentence encoder, Siamese Manhattan long short-term memory (LSTM), and knowledge-based measures.

In some cases, the measure of similarity can be a threshold amount of overlap. The threshold amount of overlap may be based on one or more of a document name, document author, document creation time, document content, document location, or document metadata; and there are multiple ways to compute the overlap. For example, the document file storage resource 114 can be queried to determine whether there are other similar documents the same location (e.g., same SharePoint site).

In cases where the trigger is time based, the document run identifier 106 may identify that the document belongs to the document run prior to receiving the trigger.

In response to determining the document belongs to a document run, the document run identifier 106 can determine at least two documents (e.g., most recent documents 154) in the document run to be used to create the content frame. Indeed, when a document run is identified, the document run identifier 106 can determine which documents from the document run should be used to create and assemble the content frame.

At least two documents from the document run are used to create and assemble the content frame. In some cases, the at least two documents used to create the content frame are the most recent documents in the document run. For example, if a document run includes 100 existing weekly reports, at least the two most recent weekly reports can be used to create the content frame.

In some cases, the new document is part of a previously identified document run (having a corresponding content frame) stored in the identified document runs repository 112. In these cases, the document run identifier 106 can determine if the cached content frame needs to be updated. That is, the document run identifier 106 can determine if the cached content frame was generated based on the most recent documents in the document run (e.g., documents were added to the document run after the cached content frame was generated).

Returning to the illustrative example, the document run identifier 106 determines that the at least two documents in the document run to be used to create the content frame are "Weekly Meeting Notes_11-11-2020" document 205 and "Weekly Meeting Notes_11-04-2020" document 215. These two documents (document 205 and 215) are the two most recent weekly meeting notes documents in the document run and are used to create the content frame.

Returning to FIG. 1, the common content between the at least two documents can be determined. In some cases, portions of the at least two documents that never change can be identified. The entity recognizer 108 can be used to help identify the common content.

In some cases, the common content between the at least two documents can be identified by recognizing elements in each document in the document run, such as, but not limited to, entities, paragraphs, sections, section headings, dates, fields, uniform resource locators (URLs), email addresses, locations (e.g., street addresses), names, or quantities.

Using the recognized elements, the common elements and patterns extractor 110 can identify common elements and patterns. These common elements and patterns are considered the common content between the at least two documents.

In some cases, prior to identifying the common elements and patterns, each of the at least two documents in the document run can be annotated with the recognized elements (e.g., annotated documents 156). Each annotated document can be used by the common elements and patterns extractor 325 when identifying the common elements and patterns. In some cases, identifying the author of each of the recognized elements can aid in identifying the common elements and patterns.

In cases where one of the at least two documents includes a stored content frame, the common content of the stored content frame can be updated using one or more of the most recent documents in the document run.

The content frame platform 100 can generate the content frame (e.g., cached content frame 158*a* or open document content frame 158*b*) using the common content and provide the content frame to the document editor 102 for display and/or editing. The content frame includes at least an outline for the new document and sections of updatable content for the new document. The content frame platform 100 helps the user(s) that created the existing documents in a document run to be able to continue to write another document similar to those existing documents.

In some cases, the generated content frame may be stored for later reuse. For example, the content frame can be stored along with the identified document run in the identified document runs repository 112.

The common content (e.g., the elements and patterns identified by the common elements and patterns extractor 110) can be employed to form the basis of the content frame for the new document. Indeed, at least a portion of the common content is reused within the content frame to create the starting point for the next document in the document run.

As an example, the content frame platform 100 can analyze the common content to determine content that remains static and content that changes ("dynamic content"). The content frame can reuse at least a portion of the common content assemble the content frame. For example, the content frame platform 100 can maintain the static common content and update the dynamic common content. There are a variety of ways the dynamic common content can be updated, which will be discussed later.

Figure 2D:
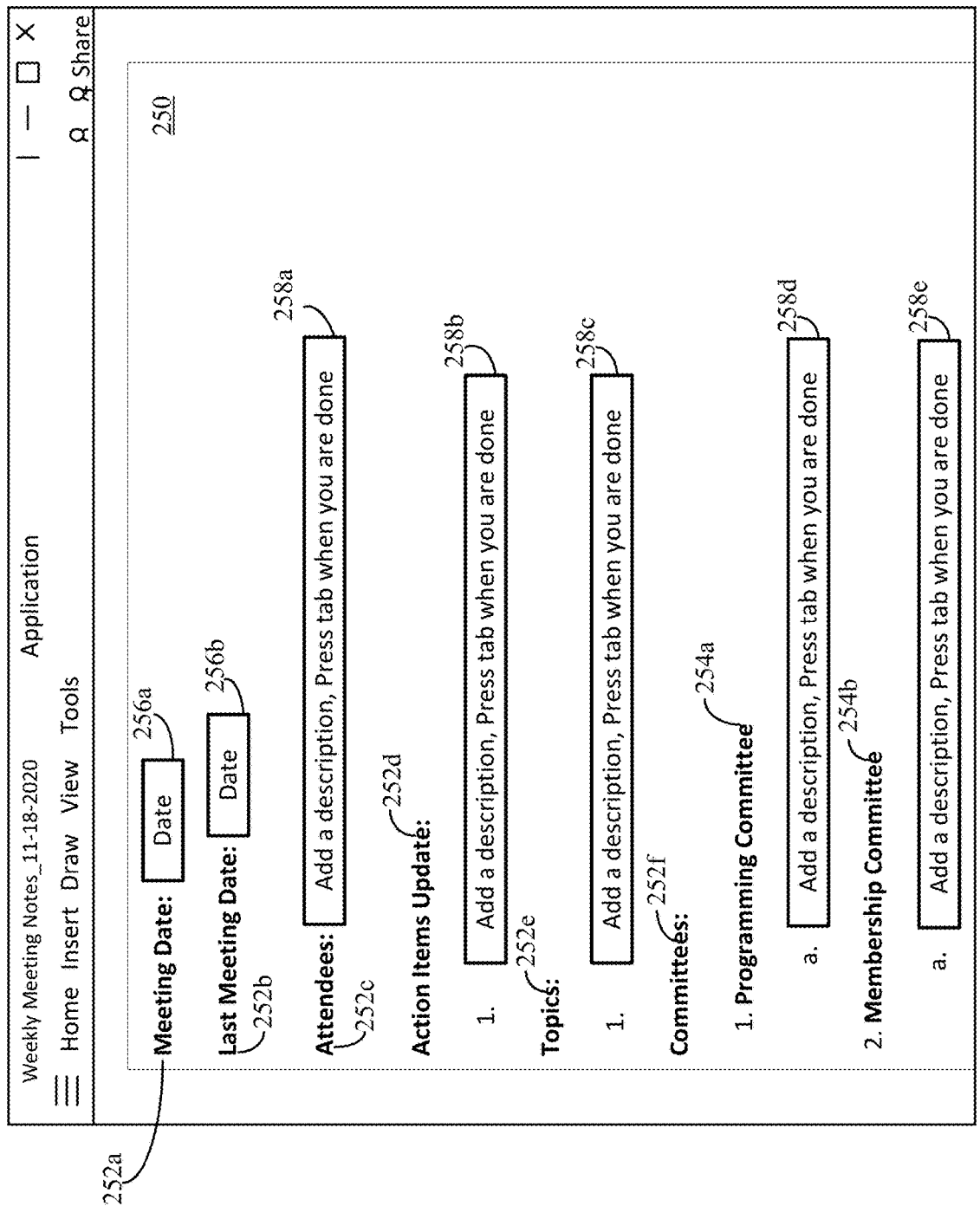
Figure 2E:
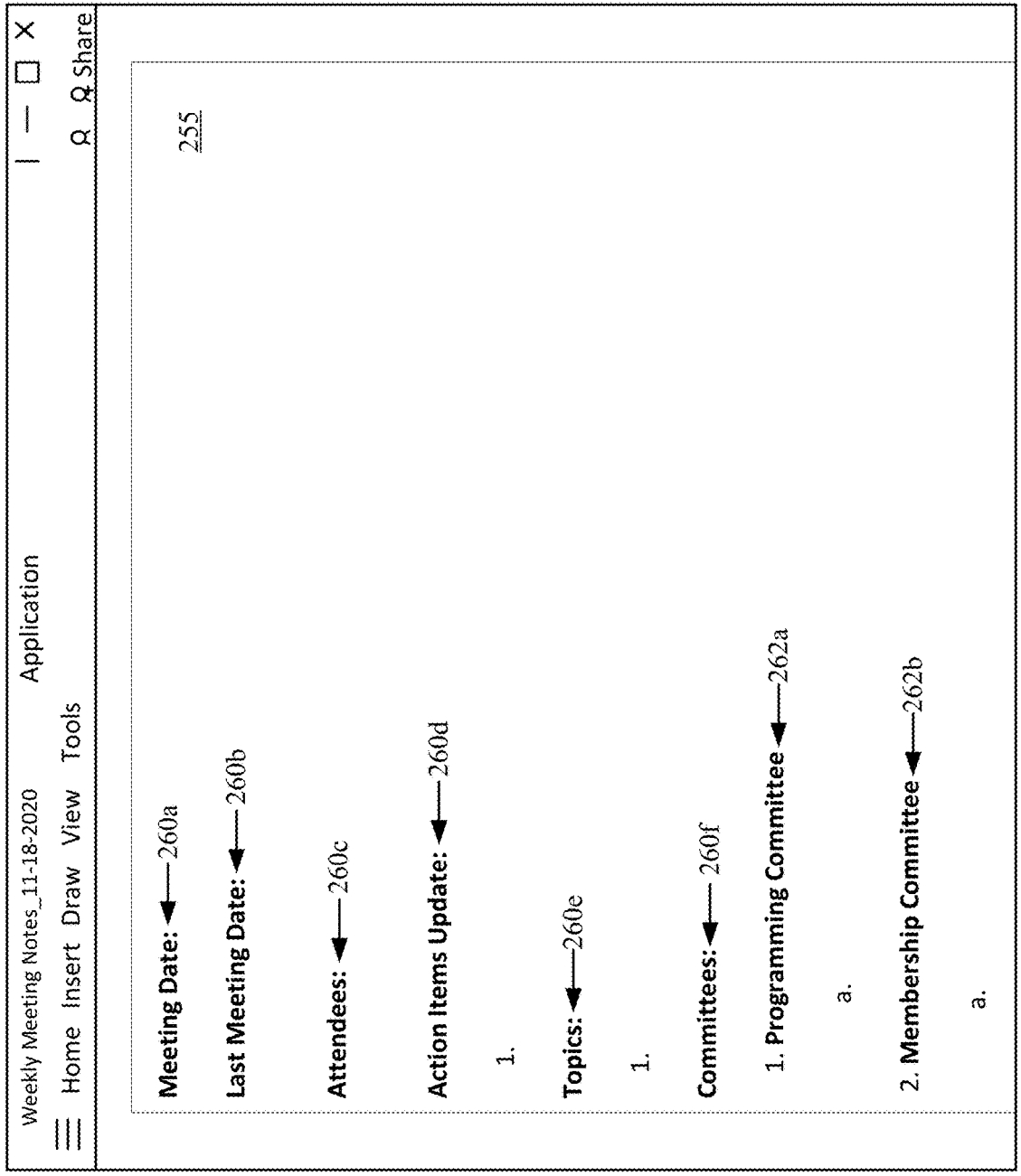
Figure 2F:
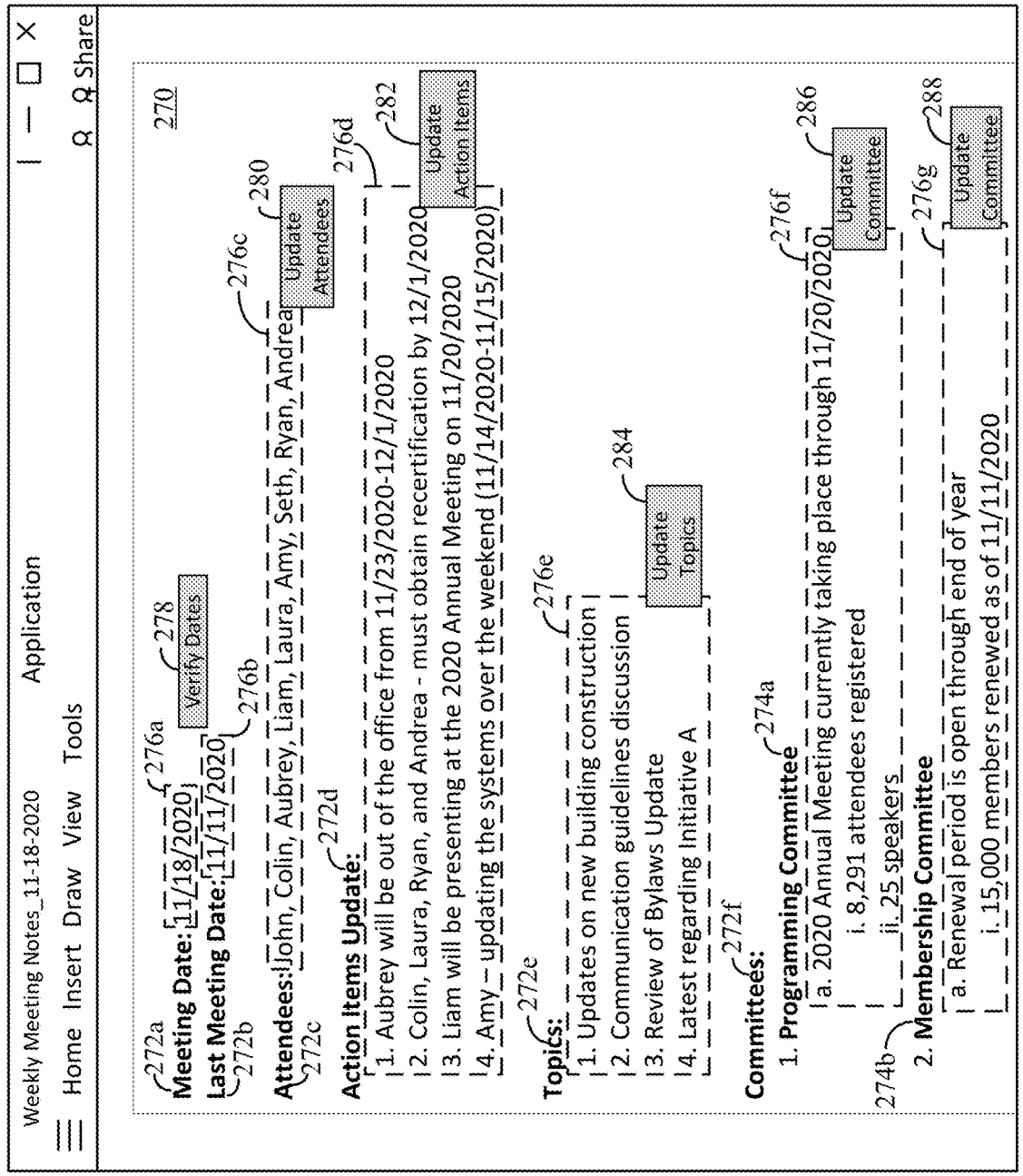

Returning to the illustrative example, FIGS. 2D-2F show example content frames for the new document ("Weekly Meeting Notes_11-18-2020" document 210 shown in FIG. 2B). As can be seen in content frame 250 of FIG. 2D, the static common content maintained include headers 252 and sub-headers 254 from the previous documents in the document run (e.g., document 205 and document 215). The headers 252 include a meeting date header 252*a*, a last meeting date header 252*b*, an attendees header 252*c*, an actions item update header 252*d*, a topics header 252*e*, and a committees header 252*f*. The sub-headers 254 include a programming committee sub-header 254*a*, and a membership committee sub header 254*b*.

Additionally, in content frame 250 the dynamic common content has been updated to include date placeholders 256 and description placeholders 258 in place of the dynamic common content. The date placeholders 256 include a meeting date placeholder 256*a* in which the date of the current meeting can be updated and a last meeting placeholder 256*b* in which the date of the previous meeting can be updated. The description placeholders 258 include an attendees placeholder 258*a*, in which the attendees of the weekly meeting can be input, an actions item update placeholder 258*b*, in which a description of any action items for the current meeting can be input, a topics placeholder 258*c*, in which a description of any topics to be discussed in the current meeting can be input, a programming committee placeholder 258*d*, in which a description of items discussed regarding the programming committee can be input, and a membership committee placeholder 258*e*, in which a description of items discussed regarding the membership committee can be input.

Once the user is finished entering a description into any of the description placeholders 258 in the content frame 250, the user can press the Tab key to move to the next description placeholder 258.

In content frame 255 of FIG. 2E, the user is provided with an outline assembled from the previous documents in the document run (e.g., document 205 and document 215). That is, the static common content is maintained, and the dynamic common content has been removed from the content frame 255. As can be seen in FIG. 2E, the static common content maintained in content frame 255 includes headers 260 and sub-headers 262 from the previous documents in the document run. The headers 260 include a meeting date header 260a, a last meeting date header 260b, an attendees header 260c, an actions item update header 260d, a topics header 260e, and a committees header 260f The sub-headers 262 include a programming committee sub-header 262a, and a membership committee sub header 262b.

In content frame 270 of FIG. 2F, the static common content and a portion of the dynamic common content are maintained. The maintained static common content includes headers 272 and sub-headers 274 from the previous documents in the document run (e.g., document 205 and document 215). The headers 272 include a meeting date header 272a, a last meeting date header 272b, an attendees header 272c, an actions item update header 272d, a topics header 272e, and a committees header 272f. The sub-headers 274 include a programming committee sub-header 274a, and a membership committee sub header 274b.

Additionally, in content frame 270 the maintained portion of the dynamic content has been updated to include visual indicators 276, and, in some cases, corresponding label informing the user of the type of content to be updated. Here, the visual indicators 276 are dotted line boxes.

The dynamic common content within the visual indicators for the meeting date and last meeting date (e.g., meeting date visual indicator 276a and last meeting date visual indicator 276b) has been prefilled with the correct information. The label corresponding to the visual indicators for the meeting date and last meeting date (e.g., verify dates label 278) informs the user that prefilled dates need to be verified.

The remaining dynamic common content includes the visual indicators 276 and corresponding labels informing the user of the type of content to be updated. The visual indicator 276c includes an "Update Attendees" label 280, visual indicator 276d includes an "Update Action Item" label 282, visual indicator 276e includes an "Update Topics" label 284, visual indicator 276f includes an "Update Committee" label 286, and visual indicator 276g includes an "Update Committee" label 288.

Figure 3:
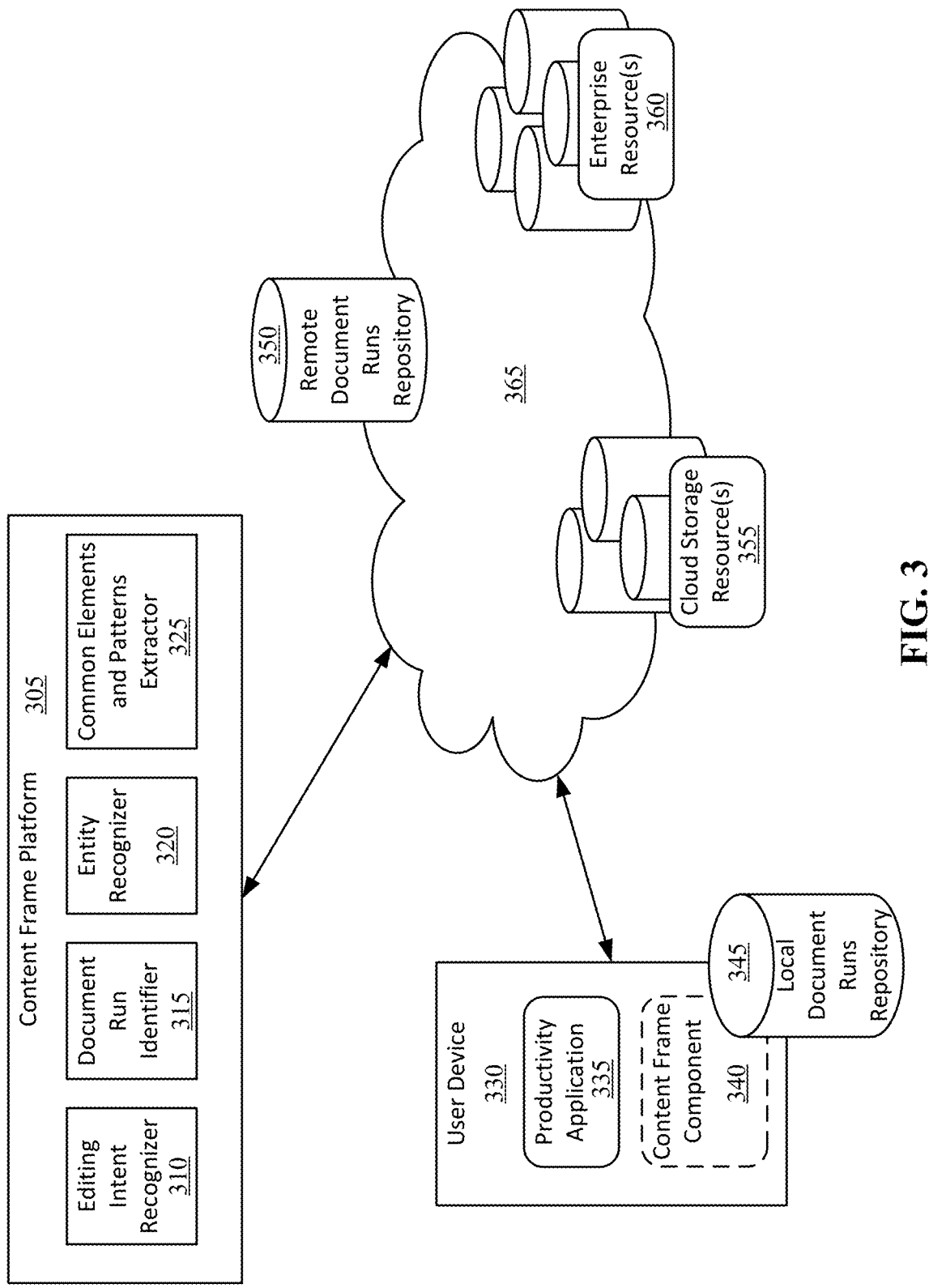
FIG. 3 illustrates an example operating environment in which various embodiments of the invention may be practiced.
Figure 4:
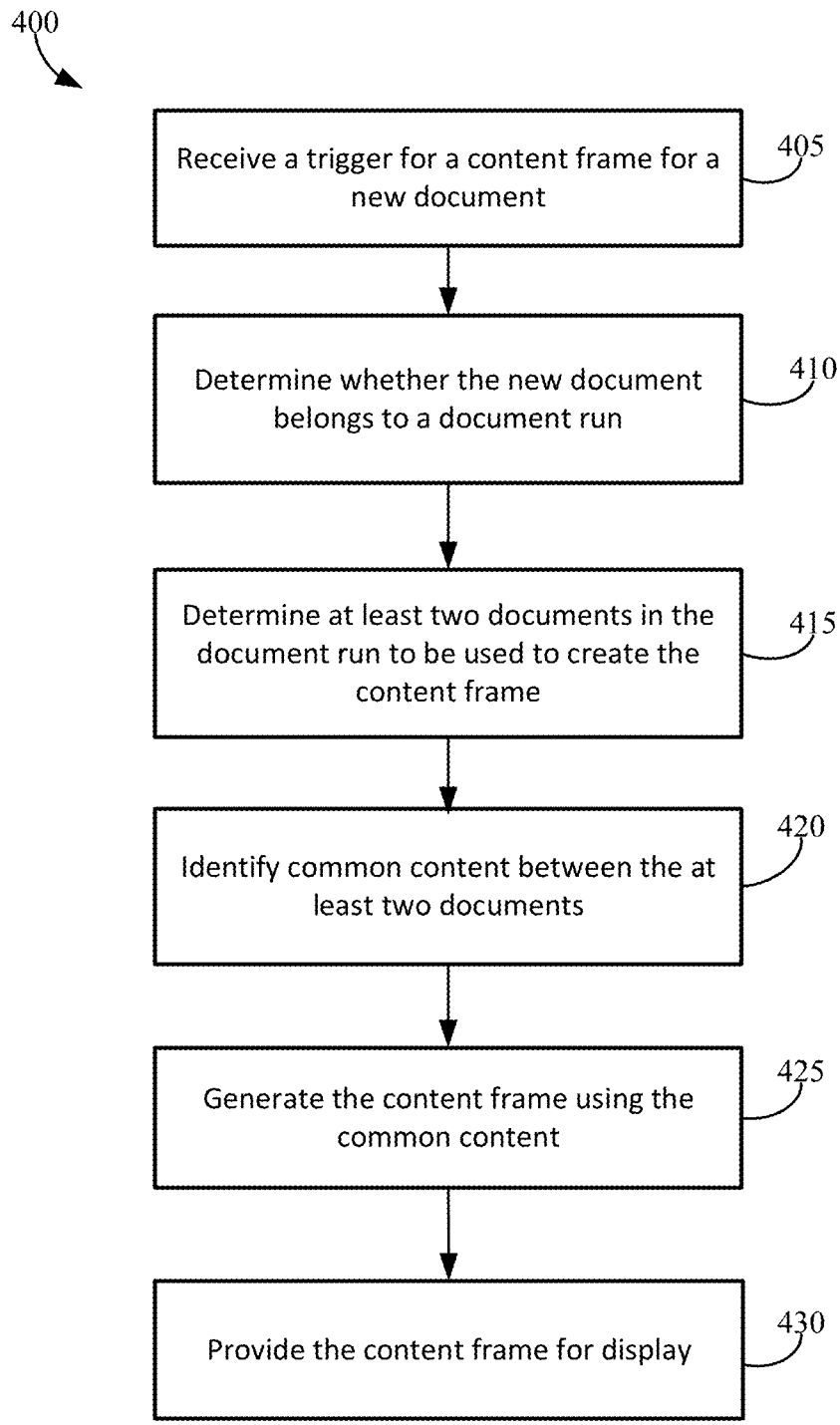
FIG. 4 illustrates an example process flow for providing content frames for productivity applications according to certain embodiments of the invention.

FIG. 3 illustrates an example operating environment in which various embodiments of the invention may be practiced; and FIG. 4 illustrates an example process flow for providing content frames for productivity applications according to certain embodiments of the invention.

Referring to FIG. 3 and FIG. 4, an example operating environment 300 may include a content frame platform 305, an editing intent recognizer 310, a document run identifier 315, an entity recognizer 320, a common elements and patterns extractor 325, a user device 330, a productivity application 335, a content frame component 340, and a plurality of storage resources (e.g., a local identified document runs repository 345, a remote identified document runs repository 350, cloud storage resource(s) 355, and enterprise resource(s) 360).

Figure 11:
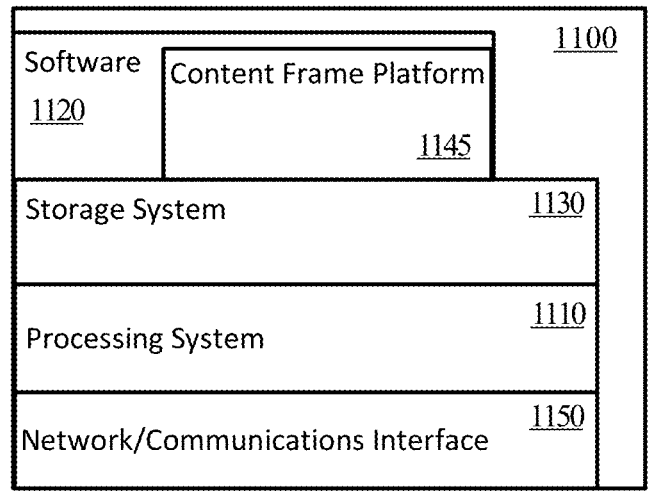
FIG. 11 illustrates components of an example computing system that may be used to implement certain methods and services described herein.

The content frame platform 305, performing process 400, can be implemented by a system embodied as described with respect to system 1100 as shown in FIG. 11. The content frame platform 305 includes or communicates with the editing intent recognizer 310, the document run identifier 315, the entity recognizer 320, and the common elements and patterns extractor 325.

The local identified-document-runs repository 345 and the remote identified-document-runs repository 350 store information of previously identified document runs. The previously identified document runs may be identified for a user and/or a user group. In some cases, a previously generated content frame can be stored associated with a previously identified document run for the user and/or the user group. Document files may be stored in the cloud storage resource(s) 355 and the enterprise resource(s) 360 (cloud-based or local network).

The user device 330 can be, but is not limited to, a personal computer (e.g., desktop computer), laptop, personal digital assistant (PDA), video game device, mobile phone (or smart phone), tablet, slate, terminal, holographic-enabled device, and the like. It should be apparent that the user device 330 may be any type of computer system that provides its user the ability to load and execute software programs and the ability to access a network, such as network 365.

Productivity application 335 is a program for creating or consuming content. The productivity application 335 may be a local/desktop application or may be a web browser or front-end application that accesses the application over the Internet or other network (e.g., network 365). Thus, the productivity application 335 may be a client-side application and/or a non-client side (e.g., a web-based) application.

The content frame component 340 may be integrated with productivity application 335 as an inherent feature of productivity application 335 or as a plug in or extension for an existing productivity application 335 to provide the content frame component 340. In some cases, the content frame component 340 may be integrated with the operating system (not shown) of the user device 330. Content frame component 340 is used by the productivity application 335 to communicate with the content frame platform 305.

To begin process 400, of the content frame platform 305 can receive (405) a trigger for a content frame for a new document. The trigger informs the content frame platform 305 that the user would like to reuse content in a manner that the user has done before. That is, the trigger can indicate that a user intends to reuse content from an existing document.

There are many behavioral, content, and context signals that can indicate that a user intends to reuse content from an existing document in a document run. For example, the user intent to reuse the content can be recognized based on several types of user actions. In some cases, the user intent to reuse content can be recognized when a user saves a copy of a just-opened file in the productivity application 335 under a new file name. In some cases, the user intent to reuse content can be recognized when the user deletes the main content of an existing document but retains headers. In some cases, the user intent to reuse content can be recognized when the user opens a document that has a recent modification time and is identical to another document in the same location, with an older modification time, that is part of an identified document run.

In some cases, the user intent to reuse content can be recognized when the user copies an existing file to a new name and opens that existing file having the new name. In some cases, the user intent to reuse content can be recognized when the user explicitly requests a content frame (e.g., by clicking a button on the ribbon). In some cases, the user intent to reuse content can be recognized when the user regularly copies and pastes content between documents.

In some cases, with user permission, user action data is collected while a user is interacting with and authoring (or editing content) within productivity application 335. The collected data can include the commands (available from the particular productivity application) and other interactions a user may have with portions of content while consuming or authoring the content. This data may be collected locally, for example, as part of a session (or instance) of the productivity application 335 (and stored at the user device 330). In addition or as an alternative to local collection of data, the content frame platform 305 that is associated with or that may communicate with the productivity application 335 can, with user permission collect data from a local session (and store this data at or in connection to the content frame platform 305).

In some cases, if there are two or more similar existing documents, the new document belongs to a document run. In some cases, if there is only one similar existing document (or even no similar documents), the new document does not belong to a document run.

When the content frame platform 305 receives the trigger for a content frame, the editing intent recognizer 310 can communicate the trigger to the document run identifier 315 to identify if the new document does belong to a document run. That is, when it is determined that the user would like to create and assemble content for a new document that is similar to one or more existing documents the user previously created, the editing intent recognizer 310 can notify the document run identifier 315.

In some cases, the editing intent recognizer 310 communicates an existing document in the document run from which the user intends to reuse the content along with the trigger. In some cases, the editing intent recognizer 310 communicates information about an existing document in the document run from which the user intends to reuse the content along with the trigger, such as a document name or other metadata. In some cases, the editing intent recognizer 310 communicates information about the new document along with the trigger, such as document name and document location.

In response to receiving the trigger (405), the document run identifier 315 of the content frame platform 305 can determine (410) whether the new document belongs to a document run. Here, the document run identifier 315 can attempt to identify a document run in which the new document belongs.

The document run can be determined by querying one or more data resources for similar existing documents. The one or more data resources that are queried can include the local identified document runs repository 345, the remote identified document runs repository 350, the cloud storage resource(s) 355, and the enterprise resource(s) 360. The one or more data resources can be queried using information from either the existing document or the new document.

The determination may be based on a threshold amount of overlap. The threshold amount of overlap may be based on one or more of a document name, document author, document creation time, document content, or document metadata; and there are multiple ways to compute the overlap.

In some cases, to determine the document run, other documents in a same location (e.g., same SharePoint site) of either the new document or the existing document are analyzed to determine whether there are other similar documents. For example, if there are two documents with similar names (e.g., "Report Q1 2020" and "Report Q2 2020"), the two documents may be considered as being from the same document run.

In some cases, document creation time can be used to help identify the document run if a set of documents have similar names and their creation times were regularly spaced, e.g., once a month.

In some cases, document content can be used to help identify the document run. For example, an amount of overlap between sections or words may be used to identify the document run.

In some cases, document metadata can be used to help identify the document run. For example, the one or more data resources may be queried to determine any documents having a same document run identifier as the existing document.

In some cases, the document run identifier 315 may query the one or more data resources to identify the document run based on the user (e.g., document author) or by the user group that has access to that particular folder and edited those documents.

In some cases, the local identified document runs repository 345 or the remote identified document runs repository 350 can be queried to determine if the new document and/or the existing document is part of a previously identified document run.

In some cases when a document run is identified, the documents in the document run may be stored in the local identified document runs repository 345 and/or the remote identified document runs repository 350 with the corresponding document run. In some cases, when a document run is identified, the metadata of the documents in the document run are updated to include information about the document run, such as a document run identifier.

If there is only one similar existing document (or even no similar documents), the document run identifier 315 can determine that the new document does not belong to a document run and process 400 ends.

In response to determining the new document belongs to a document run, the document run identifier 315 can determine (415) at least two documents in the document run to be used to create the content frame.

When a document run is identified, the document run identifier 315 can determine which documents from the document run should be used to create and assemble the content frame. At least two documents from the document run are used to create and assemble the content frame. In some cases, the at least two documents used to create the content frame are the most recent documents in the document run. For example, if a document run includes 100 existing weekly reports, at least the two most recent weekly reports can be used to create the content frame.

In some cases, the new document is part of a previously identified document run (having a corresponding content frame) stored in the local identified document runs repository 345 and/or the remote identified document runs repository 350. In these cases, the document run identifier 315 can determine if the cached content frame needs to be updated. That is, the document run identifier 315 can determine if the cached content frame was generated based on the most recent documents in the document run (e.g., documents were added to the document run after the cached content frame was generated).

If the cached content frame does not need to be updated, the content frame platform 305 can provide the content frame for display and/or editing.

If the cached content frame needs to be updated, the content frame platform 305 can update the cached content frame. In some cases, the cached content frame can be used as one of the at least two documents used to create the content frame, along with one or more of the most recent documents in the document run.

The content frame platform 305 can identify (420) common content between the at least two documents. The entity recognizer 320 can be used to help identify the common content.

In some cases, the common content between the at least two documents can be identified by recognizing elements in each document in the document run, such as, but not limited to, entities, paragraphs, sections, section headings, dates, fields, URLs, email addresses, locations (e.g., street addresses), names, or quantities.

Using the recognized elements, the common elements and patterns extractor 325 can identify common elements and patterns. These common elements and patterns are considered the common content between the at least two documents.

In some cases, prior to identifying the common elements and patterns, the content frame platform 305 can annotate each of the at least two documents in the document run with the recognized elements. Each annotated document can be used by the common elements and patterns extractor 325 when identifying the common elements and patterns.

In cases where one of the at least two documents includes a stored content frame, the common content of the stored content frame can be updated using one or more of the most recent documents in the document run.

The content frame platform 305 can generate (425) the content frame using the common content and provide (430) the content frame for display. In some cases, the content frame can be provided for display and editing. As previously described, the content frame includes at least an outline for the new document and sections of updatable content for the new document. The content frame platform 305 helps the user(s) that created the existing documents in a document run to be able to continue to write another document similar to those existing documents.

The common content (e.g., the elements and patterns identified by the common elements and patterns extractor 325) can be employed to form the basis of the content frame for the new document. Indeed, at least a portion of the common content is reused within the content frame to create the starting point for the next document in the document run.

As an example, the content frame platform 305 can analyze the common content to determine content that remains static and content that changes. The content frame can reuse at least a portion of the common content assemble the content frame. For example, the content frame platform 305 can maintain the static common content and update the dynamic common content. Here, the static common content can be the at least a portion of the common content that is reused in the content frame.

There are a variety of ways the dynamic common content can be updated. In some cases, the dynamic common content can be updated in the content frame by deleting the dynamic common content. In some cases, the dynamic common content can be updated in the content frame by replacing the dynamic common content with one or more placeholders. In some cases, the dynamic common content can be updated in the content frame by having highlighting applied or other visual indicators applied to the dynamic common content.

In some cases, a variety of different types of highlights can be applied to the dynamic common content. These different types of highlights can indicate the type of action that needs to be taken. For example, one type of highlight may indicate that a date should be updated. Another type of highlight may indicate that the highlighted content might need to be updated and the user should take a closer look. Yet another type of highlight may indicate that a data value has changed and needs to be validated by the user.

In some cases, the placeholders may include a label indicating what type of content should be entered. In an example where the user is an attorney and the content frame for the new document is for a contract, one label may indicate that the current date should be entered in a specific placeholder. Another label may indicate that the names of the parties involved in the contract should be updated in a specific placeholder. Yet another label may indicate that the addresses of the parties should be updated in a specific placeholder. Yet another label may indicate the preamble should be updated in a specific placeholder.

In some cases, the content frame platform 305 can pre-fill the placeholders. A placeholder may be linked to an outside source and the content frame platform 305 can obtain the most recent value and pre-fill one or more of the placeholders with that value.

In some cases, the static common content may have a visual indicator to inform the user that the content should be maintained in the new document.

Once the content frame has been provided for display at user device 330, the user can be provided with multiple options to interact with the content frame.

The user may be provided with multiple ways to navigate through the different categories of elements and patterns identified, and easily edit the corresponding instances. Such edits range from validating text and data to be kept in the new document to changing entities and quantitative data.

Rather than reading the new document word by word, the user may navigate through the new document and validate any updates a variety of ways. In some cases, the user may be provided an index of the values that need to be updated in the new document. The user can review and validate any changes through the index. For example, the user can use the index to input new values for each of the values that need to be updated. In another example, the user can use the index to validate any pre-filled values.

In some cases, the user can navigate through the new document by data categories. In one example, the user can go through the new document and review all the dates. In another example, the user can go through the new document and review all the numbers that are changing.

As previously described, a placeholder may be linked to an outside source. In some cases, the user may be given the option to provide input of the source in which a placeholder is to be linked and pre-filled from. For example, a salesperson may link a placeholder for a revenue number within a content form for a status report to a company revenue report. Then, each time the salesperson creates a new status report, the latest revenue number is automatically entered, and the salesperson just has to validate that number.

In some cases, the content frame may be stored for later reuse. For example, the content frame can be stored along with the identified document run in the local identified document runs repository 345 and/or the remote identified document runs repository 350.

FIGS. 5A-5D illustrate example scenarios for providing content frames for productivity applications according to certain embodiments of the invention. As previously described, a document run can include a series of documents that are not necessarily about the same subject; but have a very similar format. An example of this type of document run is a patent application document run. While each patent application may not be about the same subject, each patent application has a similar format or structure. For example, the specification of each patent application should include specific sections, in order. These specific sections include, for example, the title of the invention, any cross reference to related applications (if necessary), a background of the invention, a brief summary of the invention, a brief description of the drawings, a detailed description of the invention, claims, and an abstract. Further, these sections are usually identified in the patent application by section headings in uppercase with no underlining or bolding of the text.

In each patent application, at least one of these sections can include plate language that stays the same, or almost the same. To create a new patent application, a user may open an existing document, and save it under a different name. The user may delete much of the content but retain the section headers and the plate language.

Advantageously, through the described content frame platform, functionality is provided for the user to easily create the new patent application through the use of a content frame, thus expediting the authoring process. Indeed, the content frame platform provides a way for users to interact with and assemble content, such as the section headers and plate language, for the new patent application from existing documents.

Figure 5A:
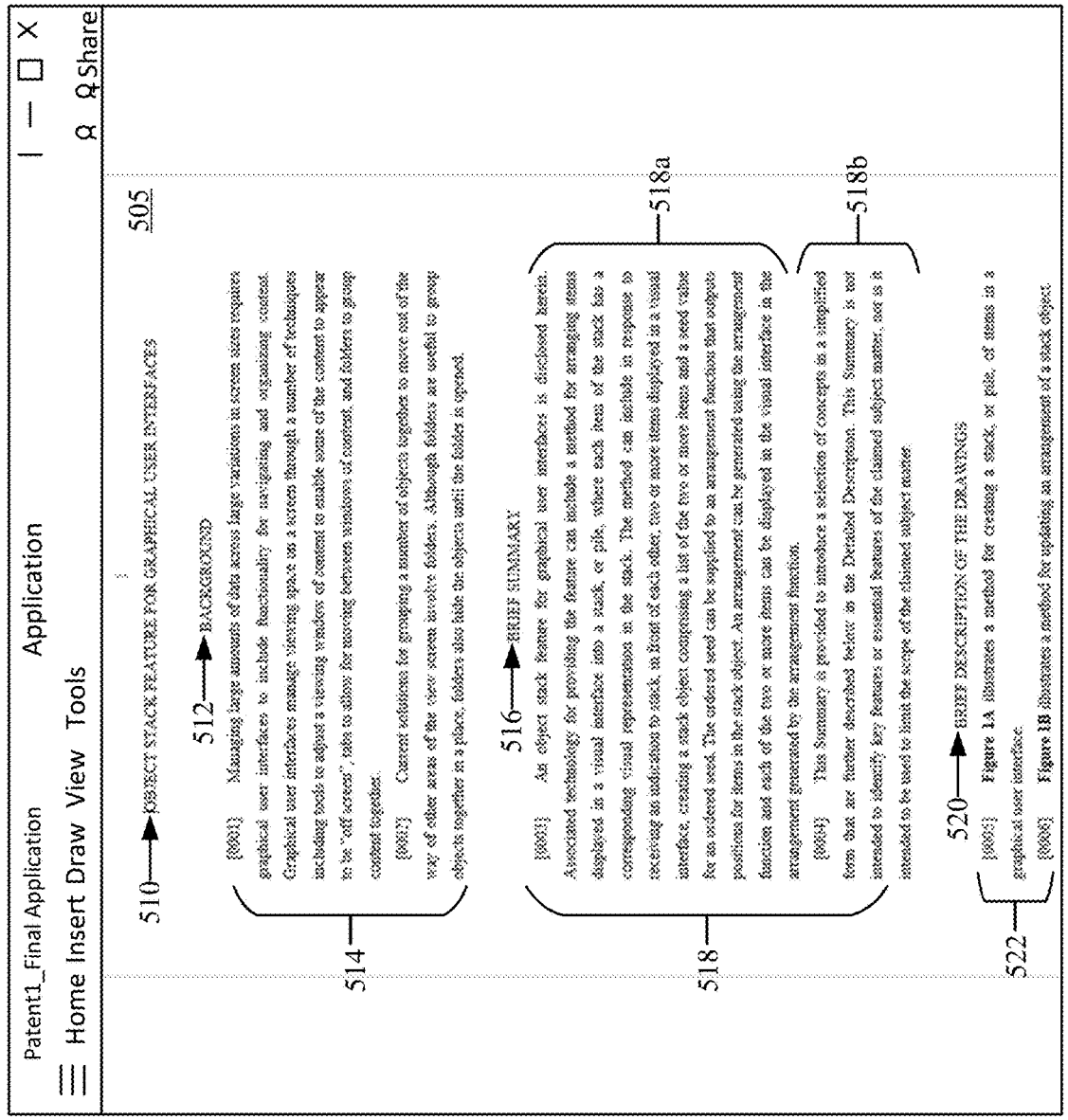
Figure 5B:
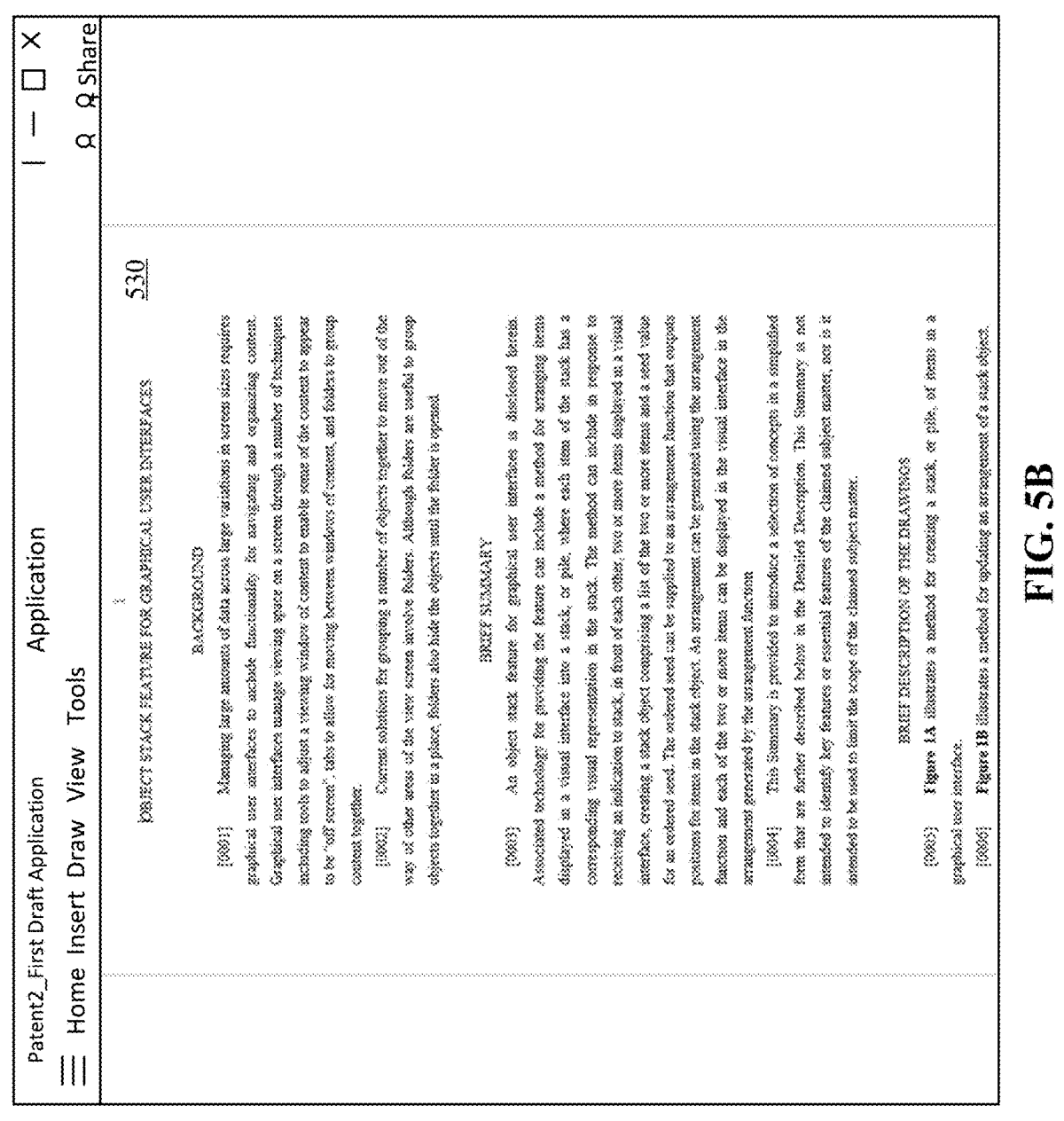

Referring to FIG. 5A and FIG. 5B, a user can open an existing patent application document (e.g., Patent1_Final Application document 505), and save that existing patent application document as a new patent application with a similar name (e.g., Patent2_First Draft Application document 530).

As can be seen, content in the existing patent application document (e.g., Patent1_Final Application document 505) includes a title 510 ("OBJECT STACK FEATURE FOR GRAPHICAL USER INTERFACES"), a "BACKGROUND" section header 512 and corresponding background description 514, a "BRIEF SUMMARY" section header 516 and corresponding brief summary description 518, a "BRIEF DESCRIPTION OF THE DRAWINGS" section header 520 and corresponding brief description of the drawings description 522. In the illustrative example, the brief summary description 518 includes updatable content 518a and the plate language 518b. Here, the plate language 518b is common to all patent applications that belong to the patent application document run.

The content frame platform can identify that the user intends to reuse content from the existing document (e.g., Patent1_Final Application document 505) in a document run and provide the user with a content frame for the new patent application (e.g., Patent2_First Draft Application document 530).

Figure 5C:
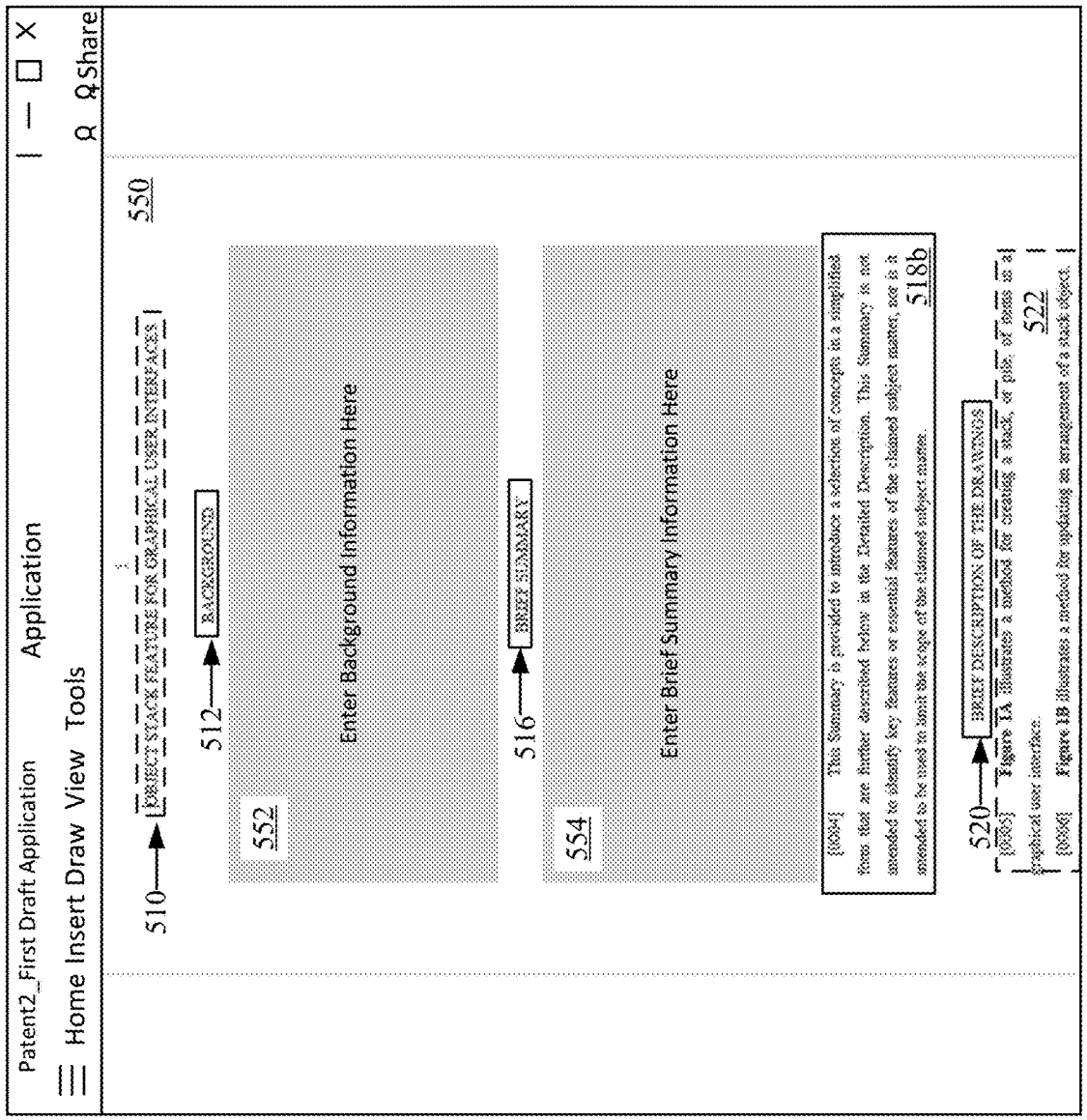
Figure 5D:
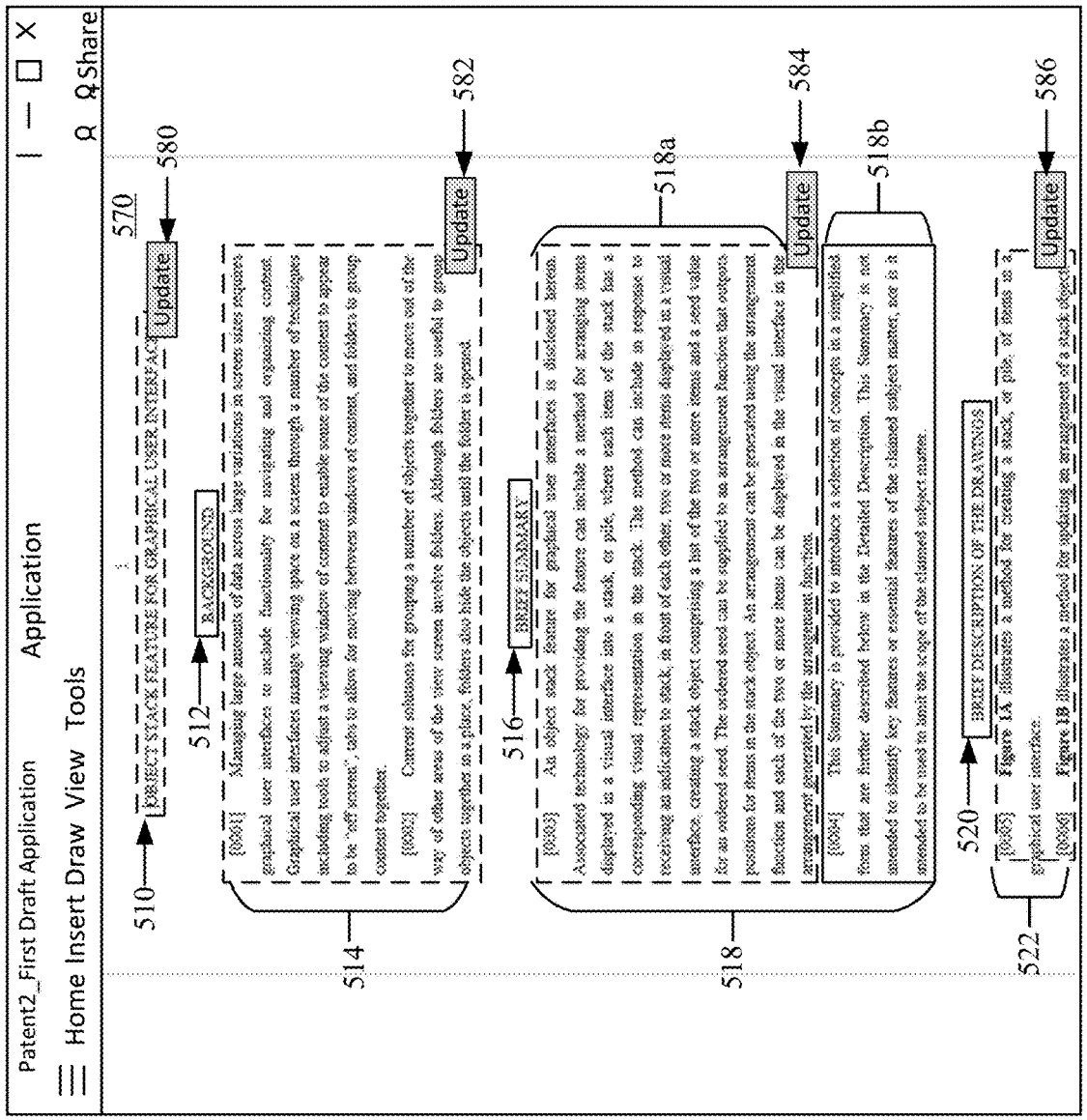

FIGS. 5C and 5D each show an example of a content frame that may be provided by the content frame platform for the new patent application (e.g., Patent2_First Draft Application document 530). Referring to FIG. 5C, in content frame 550, content that is not indicated to be changed is enclosed within a solid line box, content that may need to be changed is enclosed within a dotted line box, and content that needs to be updated or changed is replaced by a placeholder.

In the illustrative example of content frame 550, the section headers (e.g., the "BACKGROUND" section header 512, the "BRIEF SUMMARY" section header 516, and the "BRIEF DESCRIPTION OF THE DRAWINGS" section header 520), as well as the plate language 518b are enclosed in solid line boxes. Thus, this content should stay the same in the new patent application and should not be updated.

The title 510 and the brief description of the drawings description 522 are enclosed in dotted line boxes. Thus, this content should stay the same in the new patent application but may need to be updated.

The background description 514 and the updatable content 518a of the brief summary description have been deleted and replaced with placeholders (e.g., placeholder 552 and placeholder 554). Thus, this content needs to be updated or rewritten in the new patent application.

Referring to FIG. 5D, in content frame 570, content that is not indicated to be changed is enclosed within a solid line box. The remaining content (e.g., content that may need to be updated and content that does need to be updated or changed) is enclosed in a dotted line box and corresponding label indicating a review of the content and a possible update is required.

In the illustrative example of content frame 570, the section headers (e.g., the "BACKGROUND" section header 512, the "BRIEF SUMMARY" section header 516, and the "BRIEF DESCRIPTION OF THE DRAWINGS" section header 520), as well as the plate language 518b are enclosed in solid line boxes. Thus, this content should stay the same in the new patent application and should not be updated.

The title 510, the background description 514, the updatable content 518a of the brief summary description, and the brief description of the drawings description 522 are enclosed in dotted line boxes and have corresponding labels (e.g., label 580, label 582, label 584, and label 586) indicating a review of the content and a possible update is required.

Figure 6:
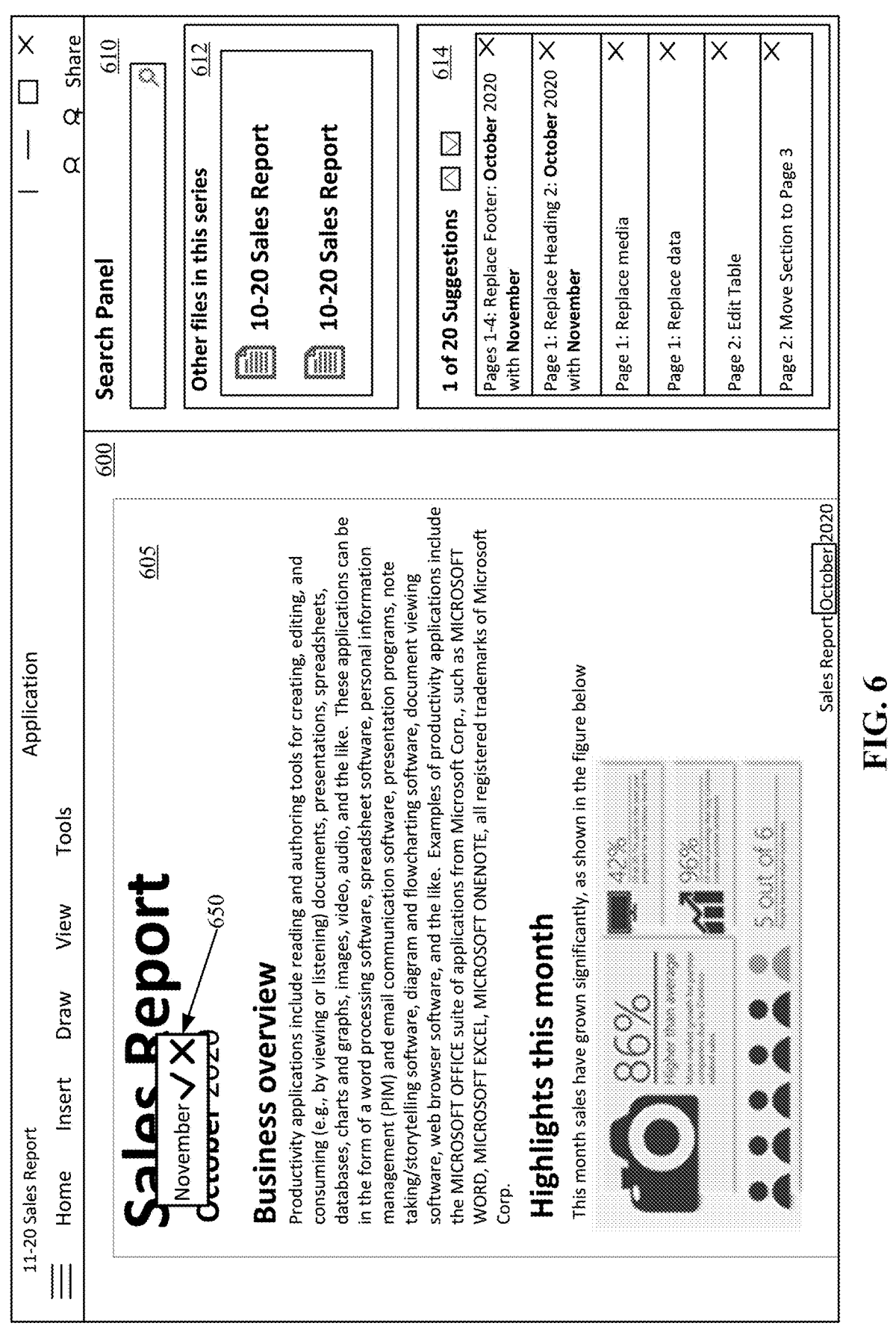
Figure 7:
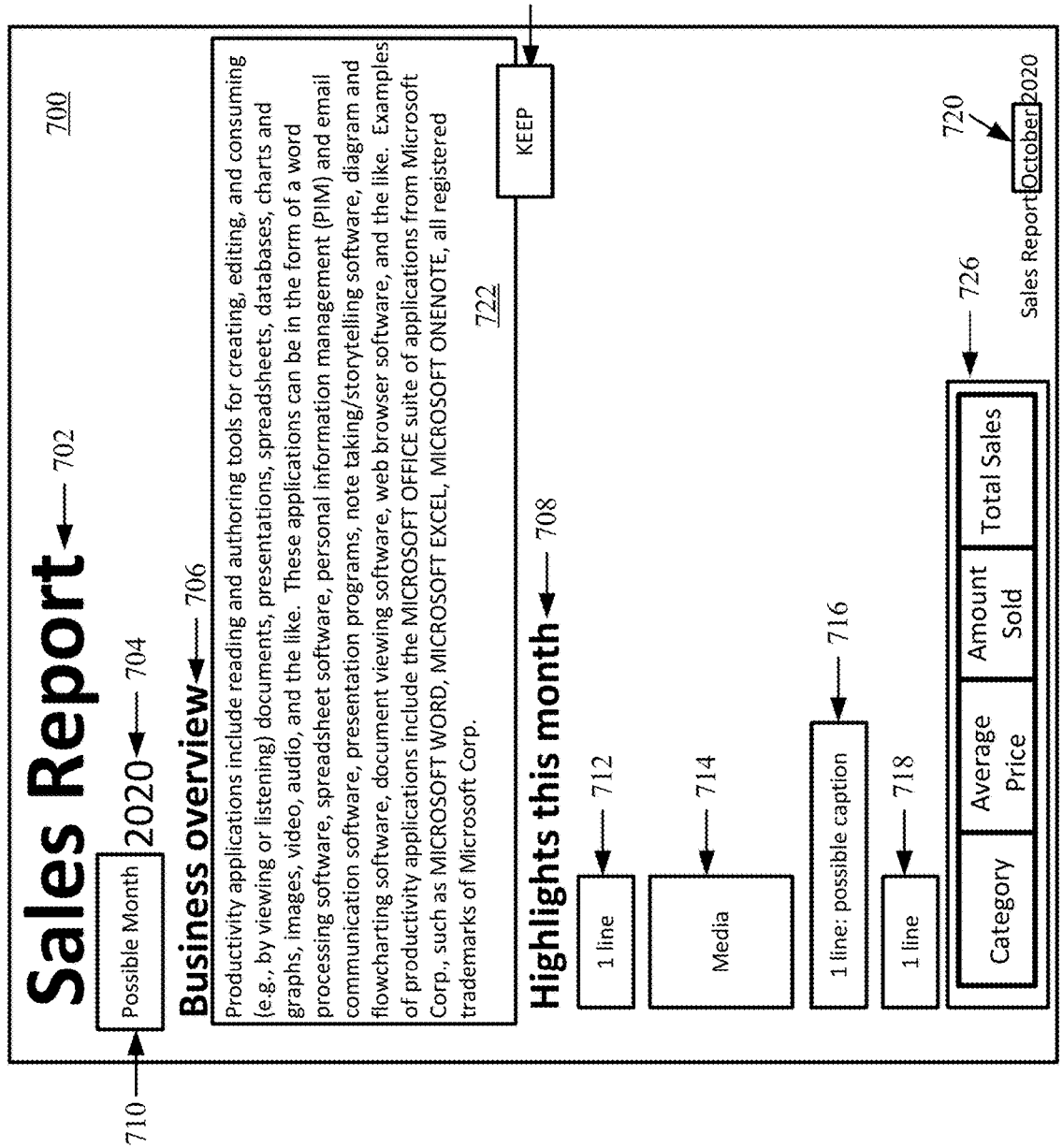
FIG. 7 illustrates another example content frame according to an embodiment of the invention.

FIG. 6 illustrates an example content frame according to an embodiment of the invention; and FIG. 7 illustrates another example content frame according to an embodiment of the invention. As previously described, a document run can include periodic documents. Periodic documents can be a series of documents that are fairly similar to one another and are reoccurring. That is, a user creates periodic documents regularly, such as a monthly sales report.

To create a new monthly sales report, a user often opens the existing sales document from the previous month and save it under a different name. The user may delete much of the content but retain the section headers.

Advantageously, through the described content frame platform, functionality is provided for the user to easily create the new monthly sales report document using a content frame, thus expediting the authoring process. Indeed, the content frame platform provides a way for users to interact with and reuse content from existing monthly sales reports.

Referring to FIG. 6, a user may be interacting with content frame 605 within a user interface 600 of a productivity application to create a new monthly sales report for November of 2020.

A search pane 610 may be presented to the user to help create and assemble the content for the new sales report. The search pane 610 can include a section identifying other similar documents (e.g., similar documents section 612) and a section providing suggestions of updates the user can make (e.g., suggestions section 614).

The similar documents section 612 provides information about other documents that are included in the document run associated with the content frame 605. In the illustrative example, the similar documents section 612 includes a heading of "Other files in this series" and shows "10-20 Contoso Sales Report" as an additional document in the document run.

The suggestions section 614 includes one or more suggestions of content that may need to be updated. In the illustrative example, the suggestions section 614 includes "Pages 1-4: Replace Footer: October 2020 with November," "Page 1: Replace Heading 2: October 2020 with November," "Page 1: Replace media," "Page 1: Replace data," "Page 2: Edit Table," and "Page 2: Move Section to Page 3." Rather than reading the new monthly sales report word by word, the user may navigate through the new monthly sales report using the suggestions section 614 and easily make changes.

The user can also make changes to the content in the content frame 605 through placeholders, such as placeholder 650. In the illustrative example, placeholder 650 is prefilled with the month "November" and the user can then accept the prefilled month value.

Referring to FIG. 7, a user may be interacting with a content frame 700 to create and assemble content for a new monthly sales report for November of 2020. In content frame 700, static content is maintained, and updateable content is replaced by a placeholder or displayed within a placeholder. In the illustrative example, the static content that is maintained includes a "Contoso Sales Report" title 702, a year "2020" portion of the date 704, a "Business overview" header 706, and a "Highlights this month" header 708.

The remaining content is the updateable content that is either replaced by a placeholder or displayed within a placeholder.

Placeholders, such as placeholder 710, placeholder 712, placeholder 714, placeholder 716, placeholder 718, placeholder 720, placeholder 722, and placeholder 726.

Placeholder 710 includes a label of "Possible month," indicating the content to be entered may be the month of the new sales report. Placeholder 712 includes a label of "1line," indicating the content to be entered should be one line of content. Placeholder 714 includes a label of "Media," indicating the content to be entered should be media content. Placeholder 716 includes a label of "1line: possible caption," indicating the content to be entered should be one line of content and may be the caption to the media to be entered in placeholder 714. Placeholder 718 includes a label of "1line," indicating the content to be entered should be one line of content. Placeholder 720 includes a label of "Possible month," indicating the content to be entered in the footer may be the month of the new sales report.

Placeholder 722 includes a copy of the previous content along with "Keep" command 724, that can allow the user to maintain the content within placeholder 722. Placeholder 726 includes a copy of a portion (e.g., headers) of a table that can be updated.

Figure 8:
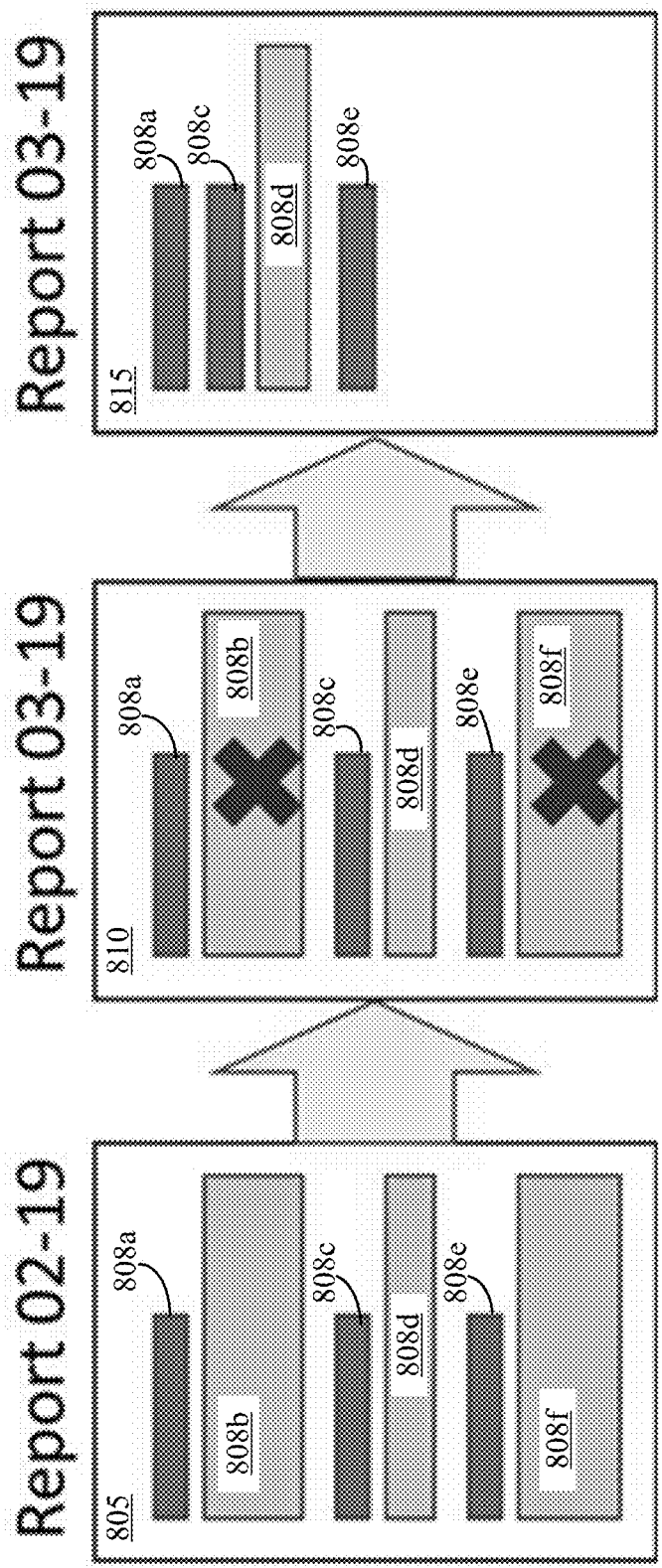
FIG. 8 illustrates an example scenario for providing content frames for productivity applications according to certain embodiments of the invention.
Figure 9:
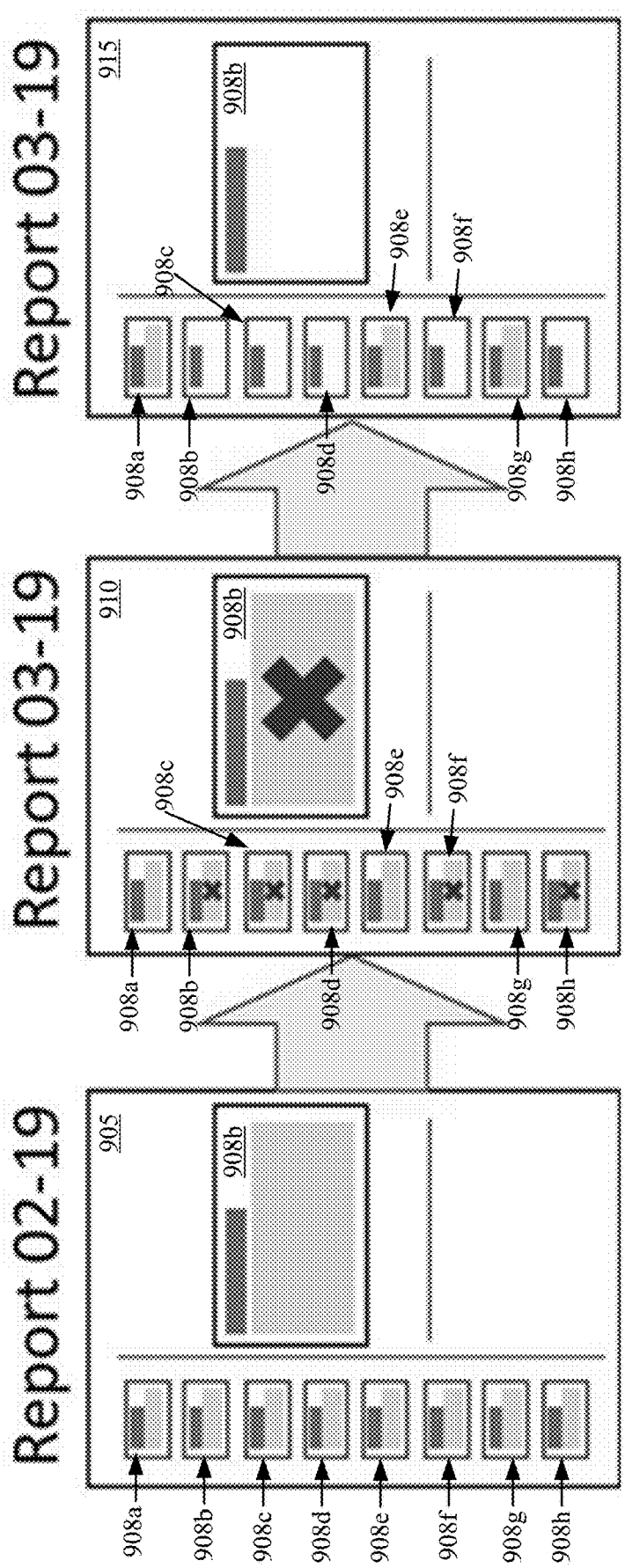
FIG. 9 illustrates another example scenario for providing content frames for productivity applications according to certain embodiments of the invention.

FIG. 8 illustrates an example scenario for providing content frames for productivity applications according to certain embodiments of the invention; and FIG. 9 illustrates another example scenario for providing content frames for productivity applications according to certain embodiments of the invention. A content frame platform can detect a document run consisting of a sequence of monthly report documents and provide functionality for a user easily create the next monthly report document in the sequence through the use of a content frame, thus expediting the authoring process. Indeed, the content frame platform provides a starting point for a user to create a new document similar to other documents the user previously created.

Referring to FIG. 8, to create and assemble content for a next document in a monthly reports document run, a user can open an existing document in the document run and save the existing document with a similar name. In the illustrative example of FIG. 8, the user opens an existing monthly report word document (e.g., "Report 02-19" document 805) that contains multiple content elements 808 (e.g., content element 808*a*, content element 808*b*, content element 808*c*, content element 808*d*, content element 808*e*, and content element 808*f*). The user then saves the existing monthly report (e.g., "Report 02-19" document 805) as new document with a similar name (e.g., "Report 03-19" document 810).

The content frame platform can determine at least two documents in the monthly reports document run to be used to create the content frame and identify common content between those at least two documents. The common content can be employed to form the basis of the content frame for the next document in the monthly reports document run.

The common content can be analyzed to determine content that remains static and content that changes. When generating the content frame, the static common content can be maintained, and the dynamic common content can be updated.

In the illustrative example, the static common content includes content element 808*a*, content element 808*c*, content element 808*d*, and content element 808*e* and the dynamic common content includes content element 808*b* and content element 808*f*. Here, the content frame (e.g., "Report 03-19" content frame 815) is assembled by maintaining the static common content and deleting the dynamic common content. Indeed, the static common content is reused to help the user create the next monthly report in the monthly reports document run.

Referring to FIG. 9, to create and assemble content for a next document in a monthly reports document run, a user can open an existing document in the document run and save the existing document with a similar name. In the illustrative example of FIG. 9, the user opens an existing monthly report presentation document (e.g., "Report 02-19" document 905) that contains slide deck with multiple slides 908 (e.g., slide 908*a*, slide 908*b*, slide 908*c*, slide 908*d*, slide 908*e*, slide 908*f*, slide 908*g*, and slide 908*h*). Each slide 908 includes content such as a header and a description. The user then saves the existing monthly report presentation (e.g., "Report 02-19" document 905) as new presentation with a similar name (e.g., "Report 03-19" document 910).

The content frame platform can determine at least two documents in the monthly reports document run to be used to create the content frame and identify common content between those at least two documents. The common content can be employed to form the basis of the content frame for the next document in the monthly reports document run.

The common content can be analyzed to determine content that remains static and content that changes. When generating the content frame, the static common content can be maintained, and the dynamic common content can be updated.

In the illustrative example, the static common content includes the header and description from slide 908*a*, slide 908*e*, and slide 908*g*, as well as the header from slide 908*b*, slide 908*c*, slide 908*d*, slide 908*f*, and slide 908*h*. The dynamic common content includes the description from slide 908*b*, slide 908*c*, slide 908*d*, slide 908*f*, and slide 908*h*. Here, the content frame (e.g., "Report 03-19" content frame 915) is assembled by maintaining the static common content and deleting the dynamic common content. Indeed, the static common content is reused to help the user create the next monthly report presentation in the monthly reports document run.

Figure 10:
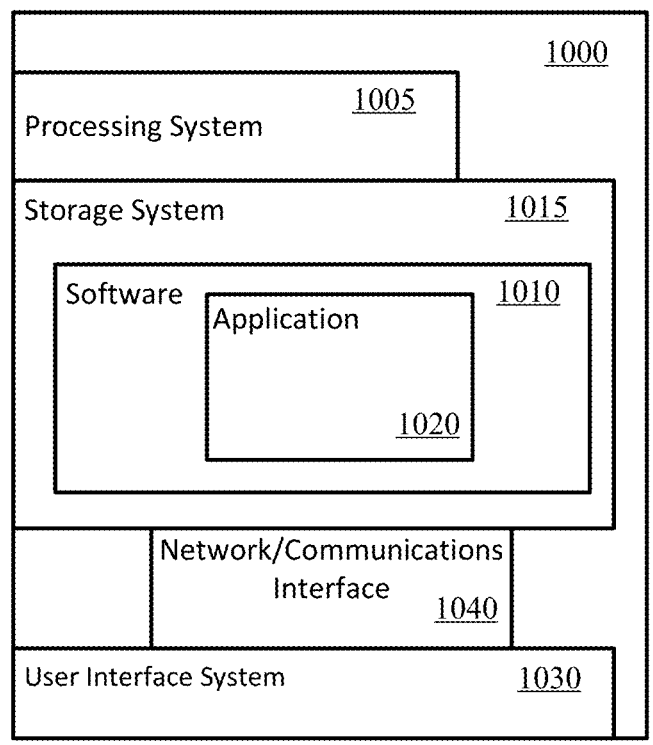
FIG. 10 illustrates components of an example computing device that may be used in certain embodiments described herein.

FIG. 10 illustrates components of an example computing device that may be used in certain embodiments described herein; and FIG. 11 illustrates components of an example computing system that may be used to implement certain methods and services described herein.

Referring to FIG. 10, system 1000 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 1000 may be incorporated to implement a particular computing device.

System 1000 includes a processing system 1005 of one or more processors to transform or manipulate data according to the instructions of software 1010 stored on a storage system 1015. Examples of processors of the processing system 1005 include general purpose central processing units, application specific processors, and logic devices, as well as any other type of processing device, combinations, or variations thereof. The processing system 1005 may be, or is included in, a system-on-chip (SoC) along with one or more other components such as network connectivity components, sensors, video display components.

The software 1010 can include an operating system (not shown) and application programs such as an application 1020 that calls the content frame platform as described herein (and which may also be included as part of software 1010, depending on implementation). Device operating systems generally control and coordinate the functions of the various components in the computing device, providing an easier way for applications to connect with lower level interfaces like the networking interface.

Storage system 1015 may comprise any computer readable storage media readable by the processing system 1005 and capable of storing software 1010 including the application 1020.

Storage system 1015 may include volatile and nonvolatile memories, removable and non-removable media implemented in any method or technology for storage of information, such as computer readable instructions, data structures, program modules, or other data. Examples of storage media of storage system 1015 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal.

Storage system 1015 may be implemented as a single storage device or may be implemented across multiple storage devices or sub-systems co-located or distributed relative to each other. Storage system 1015 may include additional elements, such as a controller, capable of communicating with processing system 1005.

Software 1010 may be implemented in program instructions and among other functions may, when executed by system 1000 in general or processing system 1005 in particular, direct system 1000 or the one or more processors of processing system 1005 to operate as described herein.

The system can further include user interface system 1030, which may include input/output (I/O) devices and components that enable communication between a user and the system 1000. User interface system 1030 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 1030 may also include output devices such as display screen(s), speakers, haptic devices for tactile feedback, and other types of output devices. In certain cases, the input and output devices may be combined in a single device, such as a touchscreen, or touch-sensitive, display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display (not shown) in myriad ways, presenting graphical user interface elements, text, images, video, notifications, virtual buttons, virtual keyboards, or any other type of information capable of being depicted in visual form.

The user interface system 1030 may also include user interface software and associated software (e.g., for graphics chips and input devices) executed by the OS in support of the various user input and output devices. The associated software assists the OS in communicating user interface hardware events to application programs using defined mechanisms. The user interface system 1030 including user interface software may support a graphical user interface, a natural user interface, or any other type of user interface. For example, the user interfaces for the application 1020 described herein may be presented through user interface system 1030.

Network/communications interface 1040 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the operating system, which informs applications of communications events when necessary.

Certain aspects described herein, such as those carried out by the content frame platform described herein may be performed on a system such as shown in FIG. 11. Referring to FIG. 11, system 1100 may be implemented within a single computing device or distributed across multiple computing devices or sub-systems that cooperate in executing program instructions. The system 1100 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 1100 can include a processing system 1110, which may include one or more processors and/or other circuitry that retrieves and executes software 1120 from storage system 1130. Processing system 1110 may be implemented within a single processing device but may also be distributed across multiple processing devices or sub-systems that cooperate in executing program instructions.

Storage system(s) 1130 can include any computer readable storage media readable by processing system 1110 and capable of storing software 1120. Storage system 1130 may be implemented as a single storage device but may also be implemented across multiple storage devices or sub-systems co-located or distributed relative to each other. Storage system 1130 may include additional elements, such as a controller, capable of communicating with processing system 1110.

Software 1120, including content frame platform 1145, may be implemented in program instructions and among other functions may, when executed by system 1100 in general or processing system 1110 in particular, direct the system 1100 or processing system 1110 to operate as described herein for the content frame platform 1145 (and its various components and functionality).

System 1100 may represent any computing system on which software 1120 may be staged and from where software 1120 may be distributed, transported, downloaded, or otherwise provided to yet another computing system for deployment and execution, or yet additional distribution.

In embodiments where the system 1100 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A network/communications interface 1150 may be included, providing communication connections and devices that allow for communication between system 1100 and other computing systems (not shown) over a communication network or collection of networks (not shown) or the air. The network can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

Communication to and from the system 1100 and other computing systems (not shown) may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Certain techniques set forth herein with respect to the application and/or content frame platform may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   receiving a trigger for a content frame for a new document;
   in response to receiving the trigger, determining whether the new document belongs to a document run, the document run being a sequence of two or more previously created documents which were each created by copying content from a previous file to a new file with a corresponding new name and edits or created by saving the previous file as the new file with the corresponding new name and edited;
   in response to determining the new document belongs to a document run, determining at least two documents in the document run to be used to create the content frame;
   identifying common content between the at least two documents in the document run;
   in response to identifying the common content between the at least two documents in the document run and without requiring action from a user, generating the content frame using the common content, wherein at least a portion of the common content is reused in the content frame, wherein the content frame comprises at least an outline for the new document and sections of updatable content for the new document; and
   providing the content frame for display.

2. The method of claim 1, wherein the trigger is an indication a user intends to reuse content from an existing document.

3. The method of claim 1, wherein the trigger is an indication a user copied content of an existing file to a file with a new name and opened for editing the file with the new name.

4. The method of claim 1, wherein the determining of the at least two documents to be used to create the content frame comprises:
   querying one or more data resources for similar existing documents based on a measure of similarity,
   wherein the measure of similarity is based on one or more of a document name, document author, document creation time, document content, document location, or document metadata.

5. The method of claim 1, wherein the at least two documents to be used to create the content frame are most recent documents in the document run.

6. The method of claim 1, wherein the identifying of the common content between the at least two documents comprises:
   recognizing elements in each of the at least two documents; and
   identifying common elements and patterns based on the recognized elements, the common elements and patterns being the common content.

7. The method of claim 6, further comprising:
   prior to the identifying of the common elements and patterns, annotating the at least two documents with the recognized elements,
   wherein the annotated at least two documents are used for the identifying of the common elements and patterns.

8. The method of claim 1, wherein the generating of the content frame using the common content comprises:
   determining static common content and dynamic common content of the common content;
   maintaining the static common content in the content frame, wherein the static common content is the at least a portion of the common content that is reused in the content frame; and
   updating the dynamic common content in the content frame.

9. The method of claim 8, wherein the updating of the dynamic common content in the content frame comprises adding one or more visual indicators to the dynamic common content.

10. The method of claim 8, wherein the updating of the dynamic common content in the content frame comprises replacing the dynamic common content with one or more placeholders.

11. The method of claim 6, wherein the recognizing of the elements in each document in the document run comprises recognizing one or more of an entity, a paragraph, a section, a section heading, a date, a field, a uniform resource locator (URL), an email address, a name, a location, or a quantity.

12. A system comprising:
    a processing system;
    a storage system; and
    instructions stored on the storage system that when executed by the processing system direct the processing system to at least:
    receive a trigger for a content frame for a new document;
    in response to receiving the trigger, determine whether the new document belongs to a document run, the document run being a sequence of two or more previously created documents which were each created by copying content from a previous file to a new file with a corresponding new name and edits or created by saving the previous file as the new file with the corresponding new name and edited;
    in response to determining the new document belongs to a document run, determine at least two documents in the document run to be used to create the content frame;
    identify common content between the at least two documents in the document run;
    in response to identifying the common content between the at least two documents in the document run and without requiring action from a user, generate the content frame using the common content, wherein at least a portion of the common content is reused in the content frame, wherein the content frame comprises at least an outline for the new document and sections of updatable content for the new document; and
    provide the content frame for display.

13. The system of claim 12, wherein the instructions to determine the at least two documents to be used to create the content frame direct the processing system to:
    query one or more data resources for similar existing documents based on a measure of similarity,
    wherein the measure of similarity is based on one or more of a document name, document author, document creation time, document content, or document metadata,
    wherein the at least two documents to be used to create the content frame are most recent documents in the document run.

14. The system of claim 12, wherein the instructions to identify the common content between the at least two documents direct the processing system to:
    recognize elements in each of the at least two documents; and
    identify common elements and patterns based on the recognized elements, the common elements and patterns being the common content.

15. The system of claim 12, wherein the instructions to generate the content frame using the common content direct the processing system to:
- determine static common content and dynamic common content of the common content;
- maintain the static common content in the content frame, wherein the static common content is the at least a portion of the common content that is reused in the content frame; and
- update the dynamic common content in the content frame.

16. The system of claim 15, wherein the instructions to update the dynamic common content in the content frame direct the processing system to replace the dynamic common content with one or more placeholders.

17. A computer-readable storage medium having instructions stored thereon that, when executed by a processing system, perform a method comprising:
- receiving a trigger for a content frame for a new document;
- in response to receiving the trigger, determining whether the new document belongs to a document run, the document run being a sequence of two or more previously created documents which were each created by copying content from a previous file to a new file with a corresponding new name and edits or created by saving the previous file as the new file with the corresponding new name and edited;
- in response to determining the new document belongs to a document run, determining at least two documents in the document run to be used to create the content frame;
- identifying common content between the at least two documents in the document run;
- in response to identifying the common content between the at least two documents in the document run and without requiring action from a user, generating the content frame using the common content, wherein at least a portion of the common content is reused in the content frame, wherein the content frame comprises at least an outline for the new document and sections of updatable content for the new document; and
- providing the content frame for display.

18. The medium of claim 17, wherein the determining of the at least two documents to be used to create the content frame comprises:
- querying one or more data resources for similar existing documents based on a measure of similarity,
- wherein the measure of similarity is based on one or more of a document name, document author, document creation time, document content, document location, or document metadata.

19. The medium of claim 17, wherein the identifying of the common content between the at least two documents comprises:
- recognizing elements in each of the at least two documents; and
- identifying common elements and patterns based on the recognized elements, the common elements and patterns being the common content.

20. The medium of claim 18, wherein the generating of the content frame using the common content comprises:
- determining static common content and dynamic common content of the common content;
- maintaining the static common content in the content frame, wherein the static common content is the at least a portion of the common content that is reused in the content frame; and
- updating the dynamic common content in the content frame.

* * * * *